US007713580B2

(12) United States Patent
Yamamoto et al.

(10) Patent No.: US 7,713,580 B2
(45) Date of Patent: May 11, 2010

(54) IMAGE RECORDING MEDIUM MANUFACTURING METHOD

(75) Inventors: Hiroshi Yamamoto, Shizuoka (JP); Hirokazu Kawai, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 947 days.

(21) Appl. No.: 11/157,964

(22) Filed: Jun. 22, 2005

(65) Prior Publication Data

US 2005/0281964 A1 Dec. 22, 2005

(30) Foreign Application Priority Data

Jun. 22, 2004 (JP) ............................. 2004-183728

(51) Int. Cl.
*B29D 7/00* (2006.01)
*B05D 3/12* (2006.01)
*B05D 7/00* (2006.01)

(52) U.S. Cl. ....................... 427/179; 427/177; 427/402; 427/407.1; 427/411

(58) Field of Classification Search .............. 427/372.2, 427/385.5, 402, 407.1, 411, 177, 179
See application file for complete search history.

(56) References Cited

U.S. PATENT DOCUMENTS 5,566,906 A 10/1996 Kamada et al.
5,843,572 A * 12/1998 Yasuda et al. ............ 428/32.31
6,492,005 B1 * 12/2002 Ohbayashi et al. ....... 428/32.29

FOREIGN PATENT DOCUMENTS

JP 10-29749 A 2/1998
JP 2002-356051 A 12/2002

OTHER PUBLICATIONS

Patent Abstracts of Japan, vol. 1995, No. 09, Oct. 31, 1995 & JP 07 157164 A (Ricoh Co Ltd), Jun. 20, 1995.
Patent Abstracts of Japan, vol. 1997, No. 03, Mar. 31, 1997 & JP 08 307594 A (Matsushita Electric Ind Co Ltd), Nov. 22, 1996.

* cited by examiner

*Primary Examiner*—Elena T Lightfoot
(74) *Attorney, Agent, or Firm*—Sughrue Mion, PLLC

(57) ABSTRACT

The invention relates to a manufacturing method of an image recording medium wherein during the process of cutting a long roll body of the medium into sheet like product the curl tendency, a cause of poor printer feedability, is removed, and at the same time the generation of cracking in a recording layer is suppressed. In the manufacturing method a web of a long roll body, a sheet like material of a paper substrate with thermoplastic resin layers formed on both surfaces one of which also has a recording layer with the long roll body wound such that this recording layer surface is on the outside, is unwound into a cutting device whilst at the same time a straightening element of a roller of diameter between 8 mm and 16 mm is pressed against the side of the recording layer with a wrap angle that is less than 60 degrees.

20 Claims, 2 Drawing Sheets

IMAGE RECORDING MEDIUM MANUFACTURING METHOD

CROSS-REFERENCE TO RELATED APPLICATION

This application claims priority under 35USC 119 from Japanese Patent Application No. 2004-183728, the disclosure of which is incorporated by reference herein.

BACKGROUND OF THE INVENTION

1. Field of the Invention

This invention is related to a high quality image recording medium manufacturing method, and in particular to a process for cutting a long roll body to give sheets with no curl.

2. Description of Related Art

With the rapid progress of the information technology industry of recent years, various information processing systems have been developed. Recording methods and recording devices suitable for these information processing systems have also been developed and put to practical use in many fields. As a practical recording method, as well as silver photographic methods there are electrophotographic methods, inkjet recording methods, thermal sensitive recording methods, sublimation transfer imaging, thermal transfer imaging and the like. With all of the above methods there is the same requirement to obtain high quality images which are sharp, and have vivid coloring.

Inkjet recording methods have become widely used, not only in the office but also in the home, since the inkjet recording method enables recording to be performed on various recording materials, the hardware (device) is relatively inexpensive and compact, and operation is quiet. Moreover, with the higher resolution of inkjet printers in recent years, it is also possible to obtain high quality photo-like printed materials. Progress made in such hardware (devices) has also led to various kinds of inkjet recording sheets being developed.

However, inkjet recording media are manufactured by taking a support body, coating with an ink receptive layer, drying and then winding up the length into a long roll. These rolls of semi-finished product are generally jumbo rolls of 0.5 to 2.5 meters in width, and about 500 to 5000 meters in length, and they are finished by slitting and cutting to form the final roll or sheet product. One of the problems which can be cited with this manufacturing process is that during storage, at the jumbo roll stage, a tendency to curl can develop. In particular when a jumbo roll is processed into sheet product, the curl tendency of the jumbo roll can transfer directly to become sheet curl. This problem becomes marked, particularly for the support body, when the stiffness is high. Sheet curl results in the occurrence of problems when printing such as poor feeding and skew. Also, when printing without a border, the curl on the trailing edge can damage a print head.

In order to address the above occurrences of curl methods for improving the coating layer have been proposed (see, for example, publications JP-A 5-28622, JP-A 8-310111, JP-A 11-291616). Also, methods for improving the support body have been proposed (see, for example, publication JP-A 2000-85343). Further still, methods of adding moisture or heat have been proposed (see, for example, publications JP-A 8-269900). However, these are not sufficient counter measures against curl.

A decurling treating process is also proposed for a recording medium where the ink receiving layer is wound up on the inside of the roll length. However, the problem of the occurrence of cracks in the ink receiving coating had not been completely solved, (see, for example JPA 2000-356051).

SUMMARY OF THE INVENTION

The present invention has been made in view of the above circumstances and provides a manufacturing method of an image recording medium wherein during the process of cutting a long roll body of the image recording medium into sheet like product the curl tendency, a cause of poor printer feedability, is removed, and at the same time the generation of cracking in a recording layer is suppressed.

A first aspect of the invention is an image recording medium manufacturing method comprising: providing a web of a long roll body, which is a sheet like material of a paper substrate with thermoplastic resin layers formed on both surfaces and on one of the thermoplastic resin layers is provided a recording layer with the long roll body wound such that this recording layer surface is on the outside; unwinding the web out into a cutting device while at the same time a straightening element is pressed against the web on the side of the recording layer wherein the straightening element is a roller of a diameter of between 8 mm and 16 mm; and conveying the web of the long roll body when straightening the curl such that it is contacted with the straightening element with a wrap angle of less than 60 degrees.

A second aspect of the invention is an image recording medium manufacturing method according to the first aspect wherein the thermoplastic resin layers are formed by melt extrusion, and the ratio (B/A), of the thickness of the thermoplastic resin layer on the side without the recording layer (B) to the thickness of the thermoplastic resin layer on the side with the recording layer (A), is between 0.9 and 1.5. Also the ratio (B/(A+C), of the thickness of the thermoplastic resin layer on the side without the recording layer (B) to the sum of the thickness of the thermoplastic resin layer on the side with the recording layer (A) added to the thickness of the recording layer (C), is between 0.4 and 0.8.

The third aspect of the invention is the method of manufacturing an image recording medium of the first aspect, wherein the thickness A of the thermoplastic resin layer on the side of the recording layer is between 15 and 60 μm.

The fourth aspect of the invention is the method of manufacturing an image recording medium of the second aspect, wherein the thickness of the thermoplastic resin layer on the side of the recording layer A is between 15 μm and 60 μm.

The fifth aspect of the invention is the method of manufacturing an image recording medium of the second aspect, wherein the paper substrate includes acacia kraft pulp of an amount which is 25% by mass or more in the pulp constituting the substrate.

The sixth aspect of the invention is the method of manufacturing an image recording medium of the third aspect, wherein the paper substrate includes acacia kraft pulp of an amount which is 30% by mass or more in the pulp constituting the substrate.

The seventh aspect of the invention is the method of manufacturing an image recording medium of the fourth aspect, wherein the paper substrate includes acacia kraft pulp of an amount which is 30% by mass or more in the pulp constituting the substrate.

The eighth aspect of the invention is the method of manufacturing an image recording medium of the fifth aspect, wherein the recording layer is an ink receiving layer, and the image recording medium is an inkjet recording medium.

The ninth aspect of the invention is the method of manufacturing an image recording medium of the sixth aspect, wherein the recording layer is an ink receiving layer, and the image recording medium is an inkjet recording medium.

The tenth aspect of the invention is the method of manufacturing an image recording medium of the seventh aspect, wherein the recording layer is an ink receiving layer, and the image recording medium is an inkjet recording medium.

The eleventh aspect of the invention is the method of manufacturing an image recording medium of the eighth aspect, wherein the ink receiving layer comprises a water soluble resin, a cross-inking agent for cross-linking the water soluble resin, fine particles, and a mordant.

The twelfth aspect of the invention is the method of manufacturing an image recording medium of the ninth aspect, wherein the ink receiving layer comprises a water soluble resin, a cross-inking agent for cross-inking the water soluble resin, fine particles, and a mordant.

The thirteenth aspect of the invention is the method of manufacturing an image recording medium of the tenth aspect, wherein the ink receiving layer comprises a water soluble resin, a cross-inking agent for cross-inking the water soluble resin, fine particles, and a mordant.

The fourteenth aspect of the invention is the method of manufacturing an image recording medium of the eleventh aspect, wherein the water soluble resin comprises at least one resin selected from the group comprising a polyvinyl alcohol resin, a cellulose resin, a resin with an ether bond, a resin with a carbamoyl group, a resin with a carboxyl group, and gelatin; and the fine particles comprise at least one type of fine particles selected from the group comprising silica fine particles, colloidal silica, alumina fine particles, and pseudoboehmite.

The fifteenth aspect of the invention is the method of manufacturing an image recording medium of the twelfth aspect, wherein the water soluble resin comprises at least one resin selected from the group comprising a polyvinyl alcohol resin, a cellulose resin, a resin with an ether bond, a resin with a carbamoyl group, a resin with a carboxyl group, and gelatin; and the fine particles comprise at least one type of fine particles selected from the group comprising silica fine particles, colloidal silica, alumina fine particles, and pseudoboehmite.

The sixteenth aspect of the invention is the method of manufacturing an image recording medium of the thirteenth aspect, wherein the water soluble resin comprises at least one resin selected from the group comprising a polyvinyl alcohol resin, a cellulose resin, a resin with an ether bond, a resin with a carbamoyl group, a resin with a carboxyl group, and gelatin; and the fine particles comprise at least one type of fine particles selected from the group comprising silica fine particles, colloidal silica, alumina fine particles, and pseudoboehmite.

The seventeenth aspect of the invention is the method of manufacturing an image recording medium of the fourteenth aspect, wherein the ink receiving layer comprises a layer which is formed by cross-ink curing of a coated layer, formed by coating with a coating liquid containing fine particles and a water soluble resin; the cross-ink curing is carried out by the addition of a cross-linking agent to either the coating liquid or a basic liquid; and, the basic liquid with a alkalinity of pH 7.1 or above is applied either (1) at the same time as the coating liquid is coated to form the coating layer or (2) after the coating liquid is coated to form the coating layer and while the coating layer is drying in the period before the coating liquid shows a reduction in the rate of drying.

The eighteenth aspect of the invention is the method of manufacturing an image recording medium of the fifteenth aspect, wherein the ink receiving layer comprises a layer which is formed by cross-ink curing of a coated layer, formed by coating with a coating liquid containing fine particles and a water soluble resin; the cross-ink curing is carried out by the addition of a cross-linking agent to either the coating liquid or a basic liquid; and, the basic liquid, with a alkalinity of pH 7.1 or above, is applied either (1) at the same time as the coating liquid is coated to form the coating layer or (2) after the coating liquid is coated to form the coating layer and while the coating layer is drying in the period before the coating liquid shows a reduction in the rate of drying.

The nineteenth aspect of the invention is the method of manufacturing an image recording medium of the sixteenth aspect, wherein the ink receiving layer comprises a layer which is formed by cross-ink curing of a coated layer, formed by coating with a coating liquid containing fine particles and a water soluble resin; the cross-link curing is carried out by the addition of a cross-linking agent to either the coating liquid or a basic liquid; and, the basic liquid, with a alkalinity of pH 7.1 or above, is applied either (1) at the same time as the coating liquid is coated to form the coating layer or (2) after the coating liquid is coated to form the coating layer and while the coating layer is drying during a period before the coating liquid shows a reduction in the rate of drying.

The twentieth image recording medium manufacturing method of manufacturing an image recording medium of the first aspect, wherein: the transfer tension applied to the web of the long roll body by the straightening element is in the range of about 5 to about 100 kg/m.

By the invention a manufacturing method of an image recording medium is provided wherein, during the process of cutting a long roll body of the image recording medium into sheet like product, the curl tendency, a cause of poor printer feedability, is removed, and at the same time the generation of cracking in a recording layer is suppressed.

DETAILED DESCRIPTION OF THE INVENTION

The invention relates to a manufacturing method of an image recording medium wherein, a web of a long roll body, a sheet like material of a paper substrate with thermoplastic resin layers formed on both surfaces one of which also has a recording layer with the long roll body wound such that this recording layer surface is on the outside, is unwound into a cutting device whilst at the same time a straightening element of a roller of diameter between 8 mm and 16 mm is pressed against the side of the recording layer with a wrap angle that is less than 60 degrees.

Figure 1:
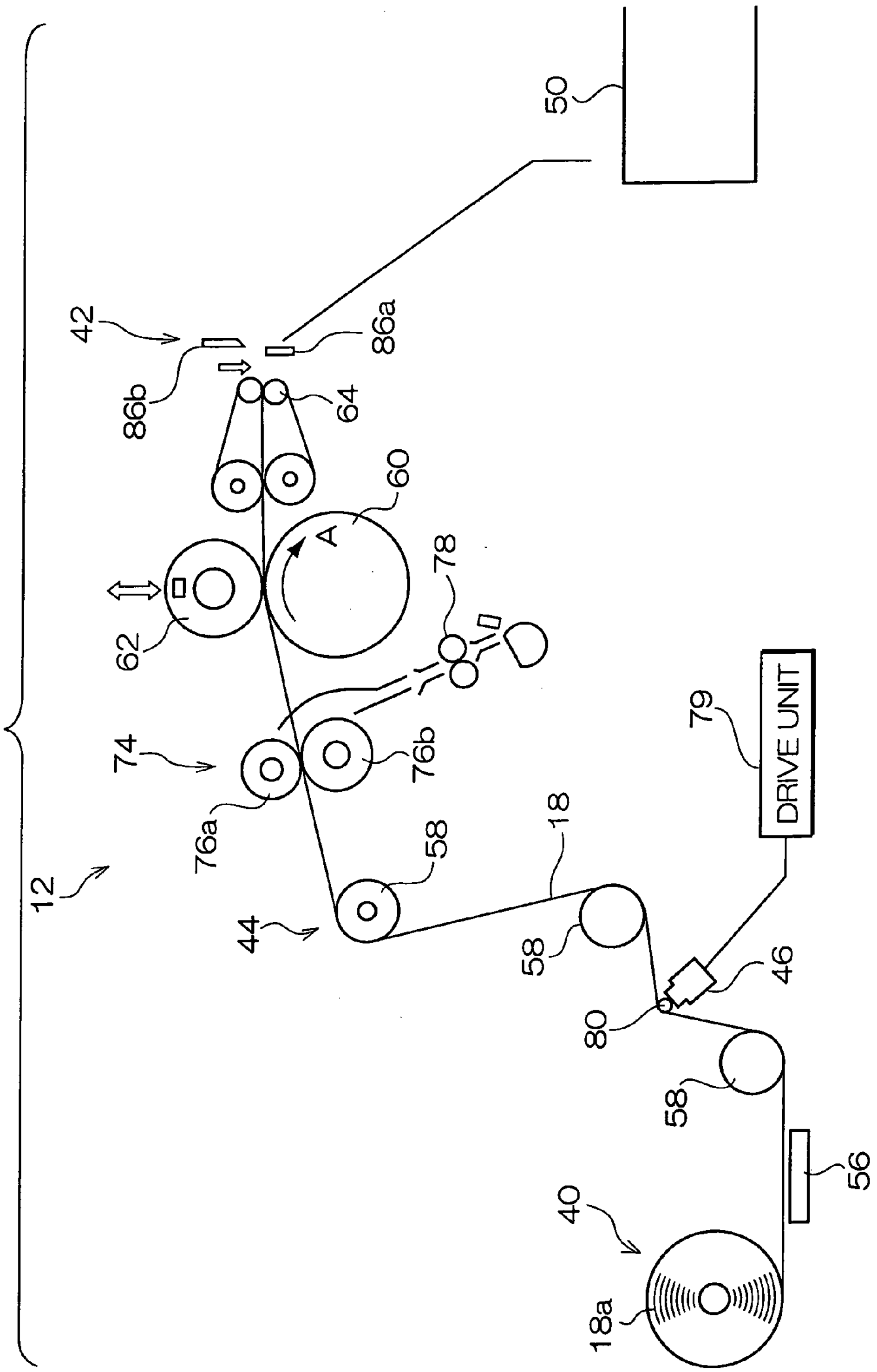
FIG. 1 shows a side view expanded explanatory diagram of an image recording medium manufacturing apparatus used for realizing the image recording medium manufacturing method of the invention.

The image recording medium manufacturing method of the invention will now be described with reference to FIG. 1. FIG. 1 shows a side view expanded explanatory diagram of an image recording medium manufacturing apparatus used for realizing the image recording medium manufacturing method of the invention.

As can be seen in FIG. 1, the image recording medium manufacturing apparatus 12 is provided with: a long roll body 18*a*, of a sheet like material wound up into a roll shape; a conveying device 44 for feeding out to a cutting device 42 a long roll body web 18 obtained by unwinding the long roll body 18*a* from the long sheet body supply device 40; a straightening device 46, for straightening out the curl of the web of the long roll body, disposed between the long sheet body supply device 40 and the cutting device 42; a change over device (not shown) disposed on the downstream side of the cutting device 42, for sorting, between a collation station (not shown) and a waste unit 50, and freely conveying the cut long roll body web 18. Also the long sheet body supply device 40 has a splicing unit 56 for splicing the trailing edge of an unwound long roll body 18*a* to the leading edge of a new long roll body 18*a* placed into the long roll supply device 40.

The conveying device 44 is provided with: multiple unwinding rollers 58; a feed roller 60 and a sliding contactable nip roller 62; and a pair of nip rollers 64, disposed near to the cutting device 42. The feed roller 60 is able to rotate in the direction A, driven by a drive source (not shown), and nip roller 62 is supported by cylinders, or the like, (not shown) and can move up and down.

As shown in FIG. 1, on the upstream side of, and near to, the feed roller 60 is disposed a slitter 74. This slitter 74 is provided with knife pairs, each made up of a top slitter knife 76*a* and a bottom slitter knife 76*b*, disposed at the edges of the long roll body web 18 in the width direction. A trim cutter 78 is disposed below the slitter 74, for cutting up the edge trim slit by the top slitter knives 76*a* and the bottom slitter knives 76*b*.

As shown in FIG. 1, the straightening device 46 is provided with a decurling bar 80 (straightening element) and a control unit 79, for pressing the decurling bar 80, at a position between the two unwinding rollers 58, against the long roll body web 18 on the side of the recording layer.

Also, spanning in a direction which is across the conveying direction of the long roll body web 18, is provided the cutting device 42 with a fixed knife 86*a* and above the fixed knife 86*a* a movable knife, which can move up and down.

In the image recording medium manufacturing apparatus 12: the long roll body 18*a* is unwound, by the feed roller 60 being made to rotate in the direction of arrow A; the curl of the unwound long roll body web 18 is straightened by the straightening device 46. The straightened curl long roll body web 18 is conveyed to the cutting device 42 by the conveying device 44, cut there, and then sorted to the collating station (not shown) or the waste unit 50. After collation of the cut long roll body web 18 that was sorted into the collating station, it is conveyed to the storage device (not shown) and the image recording medium is obtained.

In the image recording medium manufacturing method of the invention, there are the following characteristics: the recording layer is on the outside of the long roll body 18*a*; the straightening device 46, on the recording layer side of the long roll body web 18, applies an 8 to 16 mm diameter roller, as the decurling bar 80, against long roll body web 18, on the recording layer side, so as to form a wrap angle of less than 60°.

In the above manner, by applying an 8 to 16 mm diameter roller as the decurling bar 80 against long roll body web 18 so as to form a wrap angle of up to 60°, the curl tendency of the long roll body can by removed, and at the same time the occurrence of cracks in the image recording layer can be suppressed.

Figure 2:
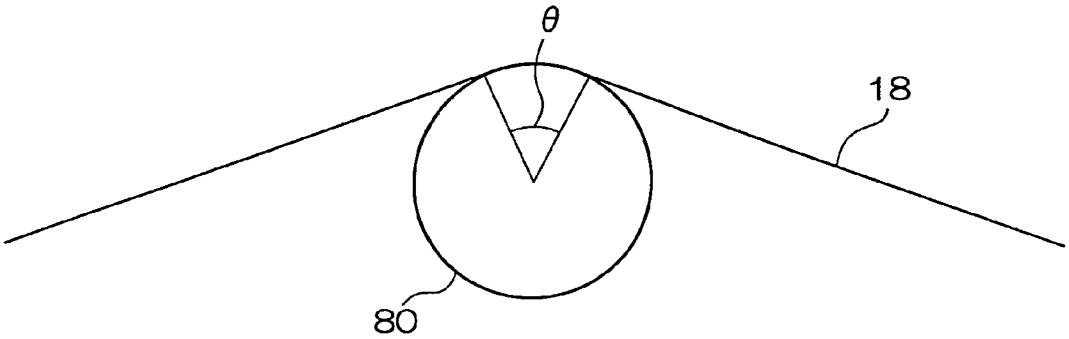
FIG. 2 is an explanatory diagram to explain a wrap angle.

Here, the "wrap angle" will be explained with reference to FIG. 2. FIG. 2 is a pattern diagram for explaining the wrap angle. As is shown in FIG. 2, θ is the angle formed by the crossing of the straight lines linking the center of decurling bar 80 to the edges of the area of contact of the long roll body web 18 wrapping around the decurling bar 80. The smallest case (when the decurling bar 80 and the long roll body web 18 only contact at one point) is 0°.

In the invention the wrap angle is up to 60°, it is preferably 30 to 60°, and 45 to 55° are more preferable. By making the wrap angle up to 60° the curl tendency of the long roll body web 18 can be removed. However, if the wrap angle is greater than 60° then cracks in the image recording medium develop.

Also, in the invention the diameter of the roller-like decurling bar 80 (straightening element) is 8 to 16 mm, and preferably 10 to 14 mm. If the diameter of decurling bar 80 is less than 8 mm then cracks in the recording layer develop, and the gloss sensitivity decreases. Also the side of the recording layer in-curls—and printer feedability deteriorates. On the other hand, if the decurling bar 80 is more than 16 mm in diameter then the tendency to curl can occur.

Also in this invention the transfer tension, caused by the decurling bar 80 pressing against the long roll body web 18 between the two unwinding rollers 58, is preferably about 5 to about 100 kg/m, more preferably about 15 to about 70 kg/m, and even more preferably about 25 to about 60 kg/m. If the transfer tension is 5 to 100 kg/m then neither do cracks in the recording layer develop, nor does printer feedablity deteriorate with the recording layer side in-curling.

The ideal conditions for carrying out the above curl straightening are a temperature of 20 to 28° C., and preferably 23 to 25° C. Also the humidity should be 45 to 56% RH, and preferably 50 to 60% RH. If the temperature is in the range 20 to 28° C. then dimensional stability does not deteriorate, and achieving the required size is easy.

Next the sheet like material will be explained.

In the invention, the sheet like material, which becomes the image recording medium by unwinding and cutting, is a paper substrate on which on both surfaces there is formed thermoplastic resin layers and on one of the thermoplastic resin layers is the recording layer.

In the invention the thermoplastic resin layers are formed by melt extrusion, and the ratio (B/A) of the thickness B of the thermoplastic resin layer on the side opposite to the recording layer, relative to the thickness A of the thermoplastic resin layer on the side with the recording layer thereon is preferably 0.9 to 1.5. The ratio (B/(A+C)) of the thickness B of the thermoplastic resin layer on the side opposite to the recording layer relative to the sum of the thickness C of the recording layer added to the thickness A of the thermoplastic resin layer on the side with the recording layer thereon is preferably 0.4 to 0.8.

From the perspective of making suitable for printer feedability the incurl relative to the recording layer surface the value of the above (B/A) is more preferably 1.1 to 1.3. If the value of (B/A) is 0.9 to 1.5 then outcurl relative to the recording layer surface does not occur, and, because incurl relative to the recording layer surface is not too strong, feeding problems also do not occur when printing.

Also, for the above ratio (B/(A+C)), from the perspective of making suitable for printer feedability and the incurl relative to the recording layer surface, the value is more preferably 0.45 to 0.55. If the value of (B/(A+C)) is 0.4 to 0.8 then outcurl relative to the recording layer surface does not occur, and, because incurl relative to the recording layer surface is not too strong, feeding problems also do not occur when printing.

Also, in the invention, the thickness A of the thermoplastic resin layer on the side of the recording layer is preferably 15 to 60 μm, and more preferably 25 to 35 μm. If the thickness A of the thermoplastic resin layer is 15 to 60 μm then it is able to absorb the effects of the roughness on the surface of the paper substrate, the glossiness does not decrease, there is no need to reduce the thickness of the paper substrate in order to avoid the overall thickness being too thick, and reduced stiffness does not occur.

On the other hand, when the image recording medium is used for inkjet printing, the thickness of the recording layer (ink receiving layer) is preferably determined with reference to the ratio of voids in the recording layer, such that the recording layer has the required absorbing capacity sufficient to completely absorb the liquid. For example, if the amount of ink is 8 nl/mm$^2$ and the void percentage is 60% then a recording layer of 15 μm or more is preferable, and 15 to 50 μm is more preferable.

Support (Paper Substrate)

The base paper (paper substrate) used for the support of the invention contains a kraft pulp obtained from acacia species. While the paper substrate most preferably comprises 100% of the acacia kraft pulp, other pulps except the acacia kraft pulp may also be contained therein. Preferable examples of the material of the pulp other than the acacia kraft pulp include natural pulps obtained from woods selected from soft wood trees and hardwood trees such as aspen, maple tree, poplar, birch, alder, oak, eucalyptus, pine and hemlock.

The paper substrate of the invention preferably comprises 25% by mass or more, and more preferably 50% by mass or more, of the acacia kraft pulp in the pulp constituting the substrate. Smoothness of the support is significantly improved, and glossiness of the support is enhanced by blending 25% by mass or more of the acacia kraft pulp in the pulp constituting the substrate.

The method for producing the acacia kraft pulp in the invention is not particularly restricted, and usual methods for producing kraft pulps may be widely used. A specific example of the production method is described below.

The acacia kraft pulp is beaten so that the pulp has a water retention value of 150 to 180%. For determining the water retention value, a suspension of the beaten pulp is filtered under suction in an appropriate centrifugal cup as a filtration vessel, then the cup containing the pulp is attached to a precipitate tube of a centrifuge, and centrifuged for a given time under prescribed conditions. The post-dewatering pulp is taken out and weighed (wet mass; A), and dried at 105° C. and weighed again (dry mass; B). The water retention value is represented by the following equation (1):

$$\text{Water retention value}=[(A-B)/B]\times 100 \quad (1)$$

The acacia kraft pulp used in the invention is preferably beaten by means of a disc-refiner so that the water retention value calculated by the above-shown equation is 150 to 180%. On the other hand, the pulps other than the acacia kraft pulp are prepared separately, and then mixed with the acacia kraft pulp. With acacia kraft pulps with a water retention value in the range of 150 to 180%, pulp fibers are sufficiently softened and improved smoothness of the support is achieved, without causing poor dewatering of the pulp during processing on the wire of a paper machine or requiring an increased amount of steam for dying.

To the mixed pulp prepared above, if necessary, are added fillers such as: clay, talc, calcium carbonate and urea resin fine particles; sizing agents such as rosin, alkylketene dimer, higher fatty acids, epoxidated fatty acid amide, paraffin wax and alkenylsuccinic acid; paper reinforcing agents such as starch, polyamide polyamine epichlorohydrin and polyacrylamide; and fixing agents such as aluminum sulfate and cationic polymers.

The slurry of the pulp prepared as above is formed into paper. The paper-making process comprises a drying step in which the web surface side corresponding to the surface for applying a recording layer on the base paper is pressed against a drum dryer cylinder via a dryer canvas. Tension of the dryer canvas is adjusted in the range of 1.5 to 3 kg/cm in this drying step.

Polyvinyl alcohol or a modified product thereof, and/or starch, a optical brightening agent such as diaminostilbene disulfonic acid, and/or a polyvalent metal chloride such as calcium chloride, magnesium chloride or aluminum chloride may be applied on one or both surfaces of the thus dried base paper.

While the thickness of the base paper support is not particularly restricted, the basis weight thereof is desirably 50 to 250 g/m$^2$, and more preferably 100 to 200 g/m$^2$. Since the image recording medium used as an inkjet recording medium is preferably smooth, a surface of the support is also desired to be excellent in smoothness and flatness. Accordingly, the surface of the support is preferably surface-treated by applying heat of 50 to 250° C. and pressure of 50 to 300 kg/cm$^2$ using a machine calender, super calender or soft calender.

Thermoplastic Resin Layer

For the thermoplastic resin to use in the thermoplastic resin layer styrene-butadiene lattices, acrylic lattices, and acrylic silicon lattices can be used but polyolefin resins are preferable. Preferable examples are: the single polymers, or mixtures of the polymers, of the α-olefins of such as polyethylene, and polypropylene; or the random copolymers of ethylene and vinyl alcohol.

For polyethylene the following, either singly or as mixtures, can be used: LDPE (Low Density Polyethylene), HDPE (High Density Polyethylene), L-LDPE (Linear Low Density Polyethylene).

In the case of polyethylene, the value measured of the melt flow rate before processing, as measured in accordance with JIS 7201 (conditions 4 in Table 1), is preferably 1.2 g to 12 g per 10 minutes.

Melt extrusion, wet laminating, and dry laminating can be used for forming the thermoplastic resin layers on the paper substrate, but melt extrusion is most preferable. When forming the thermoplastic resin layers using a melt extrusion process, before extruding the thermoplastic resin layers onto the support it is preferable to carry out pre-treatment of the support in order to strengthen the bond between the thermoplastic resin layer and the support.

For the pre-treatments of the support there is a free choice between treatments such as: acidic etching, using a sulfuric acid and chromic acid mixture; flame treatment, using a gas flame; UV irradiation treatment; corona discharge treatment; glow discharge treatment; and anchor coat treatments such as with alkyl titanate. Particularly from the perspective of simplicity corona treatment is preferable. For this corona treatment it is necessary to carry out the treatment such that a contact angle with water is less than 70 degrees.

For the anchor coating agent the following known compounds can be used: organic titanium related compounds, isocyanates (urethanes), polyethylene imines, and polybutadienes. Specifically, for known organic titanium related compounds which can be used there are: alkyl titanates such as tetraisopropyl titanate, tetrabutyl titanate, and tetrastearyl titanate; titanium acylates such as butoxy titanium stearate; titanium chelates such as titanium acetyl acetonate. Also, for isocyanates (urethanes) know compounds such as the following can be used: toluene diisocyanate (TDI), diphenylmethane diisocyanate (MDI), hexamethylene diisocyanate (HMDI), xylene diisocyanate (XDI), isophorone diisocyanate (IPDI).

The uses for the image recording medium obtained in the invention are not particularly limited and it can be appropriately used as the support body for a variety of applications requiring high quality images with brightness sensitivity, depth sensitivity, definition and high sharpness. The obtained image recording medium is preferably applied as the specific inkjet recording medium explained later, together with applications such as a thermal transfer recording medium, sublimation transfer image receiving recording medium, electrophotographic image receiving medium, thermo-sensitive coloring recording medium, silver photographic photosensitive medium, and printing paper.

Preferred embodiments of a sheet-like material in an application of the image recording medium obtained according to the invention as an inkjet recording medium will be explained below.

The sheet-like material, has a recording layer on the thermoplastic resin layer, and when obtained as an image recording medium for use as an inkjet recording medium, the recording layer is an ink receiving layer.

[Ink Receiving Layer]

When used as an inkjet recording medium the ink receiving layer preferably contains at least a water soluble resin, a cross-linking agent which can cross-link the water soluble resin, fine particles, and a mordant. When required surfactants and other such components can also be included.

The ink-absorbing capacity of the ink receiving layer is improved by a porous structure formed by containing the fine particles in the ink receiving layer. In particular, when the content of the fine particles in the solid matters of the ink receiving layer is 50% or more by mass, more preferably 60% or more by mass, the ink receiving layer can have a more favorable porous structure, further increasing the ink absorptive property thereof. Here, the content of the fine particles in the solid matters of the ink receiving layer is a content calculated with respect to the components other than water in the composition of the ink receiving layer.

The ink receiving layer having a porous structure is a layer having a void percentage of 50 to 75% and preferably of 60 to 70%. When the void percentage is less than 50% the ink absorbancy can be insufficient, and if the void percentage is more than 75% a problem of pulverization due to binder deficiency can occur. From the perspective of the quality as an inkjet recording medium, the thickness of the ink receiving layer is preferably 20 to 40 μm. Similarly, the 60° glossiness thereof is preferably 30 to 70%.

—Fine Particles—

The fine particles may be organic fine particles or inorganic fine particles. Favorable examples of the organic fine particles include polymeric fine particles obtained by such methods as emulsion polymerization, microemulsion polymerization, soap-free polymerization, seeding polymerization, dispersion polymerization and suspension polymerization. Specific examples thereof include powders, latexes, emulsion polymeric fine particles, and the like of polyethylene, polypropylene, polystyrene, polyacrylate, polyamide, silicone resins, phenol resins, natural polymers, and the like.

Alternatively, examples of the inorganic fine particles include fine particles of silica fine particles, colloidal silica, titanium dioxide, barium sulfate, calcium silicate, zeolite, kaolinite, halloysite, mica, talc, calcium carbonate, magnesium carbonate, calcium sulfate, pseudoboehmite, zinc oxide, zinc hydroxide, alumina, aluminum silicate, calcium silicate, magnesium silicate, zirconium oxide, hydroxide zirconium, cerium oxide, lanthanum oxide, yttrium oxide, and the like.

Among them, inorganic fine particles are preferable, from the viewpoints of ink absorption ability and image stability. Silica fine particles, colloidal silica, alumina fine particles, or pseudoboehmite are preferable for preparing a more favorable porous structure. These fine particles can be used singly or compositions of two or more of the fine particles can be used.

The average primary dimension of the particles is preferably 2 μm or less, and more preferably 200 μm or less.

Silica fine particles are commonly classified roughly into wet method particles and dry method (vapor phase process) particles according to the method of manufacture. In the wet method, silica fine particles are mainly produced by generating an activated silica by acid decomposition of a silicate, appropriately polymerizing the activated silica, and aggregation precipitation of the resulting polymeric silica to give hydrated silica. Alternatively, in the gas phase process, silica (anhydrous silica) particles are mainly produced by either high-temperature gas-phase hydrolysis of a silicon halide (flame hydrolysis process), or by reductively heating and vaporizing quartz and coke in an electric furnace, by applying an arc discharge and then oxidizing the vaporized silica with air (arc method). The “vapor-phase process silica” means anhydrous silica fine particles produced by the gas phase process. Vapor-phase process silica fine particles are especially preferable as the silica fine particles according to the invention.

The vapor-phase process silicas are different in the density of silanol groups on the surface and the presence of voids therein and exhibit different properties from hydrated silicas. The vapor-phase process silicas are suitable for forming three-dimensional structures which are higher in void percent. The reason for this is not clearly understood but it can be supposed that hydrated silica fine particles have a high density of silanol groups on the surface, at 5 to 8 per $nm^2$, thus the silica fine particles tend to coagulate densely. However, vapor-phase-process silica particles have a lower density of silanol groups on the surface, at 2 to 3 per $nm^2$, therefore, vapor-phase process silica seems to cause less compact, softer coagulation (flocculation), consequently leading to structures with a higher void percentage.

Vapor-phase process silicas have extremely high specific surface areas, and provide higher ink absorption and retention capacity. In addition, vapor-phase process silicas have lower refractive index, and thus if dispersed at a suitable particles diameter, provide the ink receiving layer with better transparency, and higher color density and favorable coloring of printed images is obtainable. The transparency of ink receiving layer is important from the viewpoint of obtaining a high color density and favorable coloring glossiness, not only for applications where transparency is required such as OHP sheets and the like, but also for applications such as photographic glossy papers and like recording media.

The average primary particle diameter of the vapor-phase process silica is preferably 50 nm or less, more preferably 20 nm or less, particularly preferably 10 nm or less, and most preferably 3 to 10 nm. Vapor-phase process silica particles tend to bind to each other via hydrogen bonds between silanol groups, and thus silica particles having an average primary particle diameter of 50 nm or less provide structures having high void percentages, thus effectively improving the ink-absorbing characteristics.

The silica fine particles may be used together with other fine particles described above. If another fine particles and vapor-phase process silica are used together, the content of the vapor-phase process silica to all the fine particles is preferably 30% by mass or more, and more preferably 50% by mass or more.

Alumina fine particles, alumina hydrate, and mixtures or complexes thereof are also preferable examples of the inorganic fine particles. Among them, alumina hydrate is preferable, as it absorbs and holds inks well. Pseudoboemite ($Al_2O_3.nH_2O$) is particularly preferable. Alumina hydrate may be used in a variety of forms. Alumina hydrate is preferably prepared by using boehmite in the sol state as the starting material, as it provides smoother layers more easily.

The average pore radius of pseudoboemite is preferably 1 to 25 nm and more preferably 2 to 10 nm. The pore volume thereof is preferably 0.3 to 2.0 ml/g, and more preferably 0.5 to 1.5 ml/g. The average pore radius and the pore volume are determined by the nitrogen absorption/desorption method. These values may be determined, for example, by using a gas absorption/desorption analyzer (e.g., trade name: OMNISORP 369, manufactured by Beckman Coulter, Inc.).

Among alumina fine particles, gas phase process alumina fine particles having a greater specific surface area are preferable. The average primary particle diameter of the gas phase process alumina fine particles is preferably 50 nm or less and more preferably 20 nm or less. Colloidal silicas having an average primary particle diameter of 50 nm or less are also included in preferable examples.

The fine particles may be used in the manner similar to the embodiments disclosed in, for example, JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, 2001-301314, and the like.

—Water-Soluble Resin—

It is preferable that the ink receiving layer includes a water-soluble resin. Examples of the water-soluble resins used for the ink receiving layer include polyvinyl alcohol resins having a hydroxy group as the hydrophilic constitutional unit [polyvinyl alcohol (PVA), acetoacetyl-modified polyvinyl alcohol, cation-modified polyvinyl alcohol, anion-modified polyvinyl alcohol, silanol-modified polyvinyl alcohol, polyvinylacetal, etc.]; cellulose resins [methylcellulose (MC), ethylcellulose (EC), hydroxyethylcellulose (HEC), carboxymethylcellulose (CMC), hydroxypropylcellulose (HPC), hydroxyethylmethylcellulose, hydroxypropylmethylcellulose, etc.]; chitins; chitosans; starches; ether bond-containing resins [polyethylene oxide (PEO), polypropylene oxide (PPO), polyethylene glycol (PEG), polyvinyl ether (PVE), etc.]; carbamoyl group-containing resins [polyacrylamide (PAAM), polyvinylpyrrolidone (PVP), polyacrylic acid hydrazide, etc.]; and the like. Amongst these polyvinyl alcohol resins, cellulose resins, ether bond-containing resins, carbamoyl group-containing resins, carboxyl group-containing resins and gelatins are preferable.

In addition, resins having a carboxyl group as a dissociative group, such as polyacrylate salts, maleic acid resins, and alginate salts; gelatins, and the like, are also included.

Among them, polyvinyl alcohol resins are particularly preferable. Examples of the polyvinyl alcohols include those described in Japanese Patent Application Publication (JP-B) Nos. 4-52786, 567432, and 7-29479; Japanese Patent No. 2537827; JP-B No. 7-57553; Japanese Patent Nos. 2502998 and 3053231; JP-A No. 63-176173; Japanese Patent No. 2604367; JP-A Nos. 7-276787, 9-207425, 11-58941, 2000-135858, 2001-205924, 2001-287444, 62-278080, and 9-39373; Japanese Patent No. 2750433; JP-A Nos. 2000-158801, 2001-213045, 2001-328345, 8-324105, and 11-348417; and the like.

The water-soluble resins may be used alone or in combinations of two or more. The content of the water-soluble resin in the ink receiving layer is preferably 9 to 40%, more preferably 12 to 33% by mass with respect to the total mass of the solid matter in ink receiving layer.

In the ink receiving layer of the inkjet recording medium, mainly constituted from the water-soluble resins and the fine particles described above, each substance may be used as a single-component substances or as multiple-component mixture substances.

From the viewpoint of ensuring transparency of the ink receiving layer, selection of the kind of the water-soluble resin used in combination with the fine particles is important, especially with silica fine particles. For combination with vapor-phase process silica, polyvinyl alcohol resins are preferable as the water-soluble resin. Among them, polyvinyl alcohol resins having a saponification value of 70 to 100% are preferable, and polyvinyl alcohol resins having a saponification value of 80 to 99.5% are particularly preferable.

The polyvinyl alcohol resins contain hydroxyl groups as structural units. Hydrogen bonding between the hydroxyl groups and the surface silanol groups on silica fine particles allows silica fine particles to easily form a three-dimensional network structure having secondary particles as the network chain units. This three-dimensional network structure thus constructed seems to enable the forming of an ink receiving layer having a porous structure of high void percentage and with sufficient strength.

In inkjet recording, an ink receiving layer having a porous structure like the above absorbs inks rapidly due to capillary action, and provides printed dots superior in circularity without ink bleeding.

In addition, the polyvinyl alcohol resin may be used together with other water-soluble resins. When another water-soluble resin and polyvinyl alcohol resin are used in combination, the amount of polyvinyl alcohol resin is preferably 50% by mass or more, more preferably 70% or more with respect to the total water-soluble resins.

<Ratio of the Fine Particles to the Water-Soluble Resin Contained>

The ratio of the mass of fine particles x to the mass of water-soluble resin y (PB ratio: x/y) has a great influence on the structure and strength of the ink receiving layer. A larger mass ratio (PB ratio) tends to result in increased void percentage, pore volume, and surface area (per unit mass) but decreased density and strength.

The PB ratio (x/y) for the ink receiving layer is preferably 1.5 to 10, from the viewpoints of: suppressing the decrease in layer strength, and preventing cracking thereof when dried, which may be caused by an excessively large PB value; and, preventing decrease in the ink absorptive property, by a tendency to block up with the resin, decreasing the voids, with an excessively low PB ratio.

When conveyed in paper-conveying systems of inkjet printers, stress may be applied to the inkjet recording medium. Accordingly, the ink receiving layer should have sufficiently high layer strength. Also from the viewpoints of preventing cracking, peeling, or the like of the ink receiving layer when the inkjet recording medium are cut into sheets, the ink receiving layer should have sufficiently high layer strength. Considering the above, the PB ratio is preferably 5 or less. On the other hand, from the viewpoint of ensuring superior ink absorptive property with inkjet printers, the ratio is more preferably 2 or more.

For example, when a coating liquid, containing vapor-phase process silica fine particles, having an average primary particle diameter of 20 nm or less, and a water-soluble resin homogeneously dispersed in an aqueous solution at a PB ratio (x/y) of between 2 and 5, is applied and dried on a support, a three-dimensional network structure having the secondary particles of silica fine particles as the network chains is formed. Such a coating liquid easily provides a translucent porous layer having an average void diameter of 25 nm or less, a void percentage of 50 to 80%, a void specific volume of 0.5 ml/g or more, and a specific surface area of 100 $m^2/g$ or more.

—Cross-Linking Agent—

With respect to the ink receiving layer, it is preferable that the layer containing fine particles, a water-soluble resin, and the like, contains additionally a cross-linking agent that allows cross-linking of the water-soluble resin, and thus a porous layer hardened by the cross-inking reaction between the cross-inking agent and the water-soluble resin.

The cross-linking agent for the water soluble resin, particularly with poly vinyl resins, is preferably a boron compound. Examples of boron polyallylamine derivatives compounds include borax, boric acid, borate salts [e.g., orthoborate salts, $InBO_3$, $ScBO_3$, $YBO_3$, $LaBO_3$, $Mg_3(BO_3)_2$, and $Co_3(BO_3)_2$], diborate salts [e.g., $Mg_2B_2O_5$, and $CO_2B_2O_5$], metaborate salts [e.g., $LiBO_2$, $Ca(BO_2)_2$, $NaBO_2$, and $KBO_2$], tetraborate salts [e.g., $Na_2B_4O_7.10H_2O$], pentaborate salts [e.g., $KB_5O_8.4H_2O$, $Ca_2B_6O_{11}.7H_2O$, and $CsB_5O_5$], and the like. Among them, borax, boric acid and borates are preferable since they are able to promptly cause a cross-linking reaction Compounds other than the boron compounds, as described below, can be used for the cross-linking agent of the water-soluble resin. Examples of such cross-linking agents include: aldehyde compounds such as formaldehyde, glyoxal and glutaraldehyde; ketone compounds such as diacetyl and cyclopentanedione; active halogen compounds such as bis(2-chloroethylurea)-2-hydroxy-4,6-dichloro-1,3,5-triazine and 2,4-dichloro-6-S-triazine sodium salt; active vinyl compounds such as divinyl sulfonic acid, 1,3-vinylsulfonyl-2-propanol, N,N'-ethylenebis(vinylsulfonylacetamide) and 1,3,5-triacryloyl-hexahydro-S-triazine; N-methylol compounds such as dimethylolurea and methylol dimethylhydantoin; melamine resin such as methylolmelamine and alkylated methylolmelamine; epoxy resins; isocyanate compounds such as 1,6-hexamethylenediisocyanate; aziridine compounds such as those described in U.S. Pat. Nos. 3,017,280 and 2,983611; carboxyimide compounds such as those described in U.S. Pat. No. 3,100,704; epoxy compounds such as glycerol triglycidyl ether; ethyleneimino compounds such as 1,6-hexamethylene-N,N'-bisethylene urea; halogenated carboxyaldehyde compounds such as mucochloric acid and mucophenoxychloric acid; dioxane compounds such as 2,3-dihydroxydioxane; metal-containing compounds such as titanium lactate, aluminum sulfate, chromium alum, potassium alum, zirconyl acetate and chromium acetate; polyamine compounds such as tetraethylene pentamine; hydrazide compounds such as adipic acid hydrazide; and low molecular compounds or polymers containing at least two oxazoline groups.

These cross-linking agents may be used alone, or in combinations of two or more thereof.

Cross-inking is preferably effected by adding the cross-inking agent to a coating liquid containing fine particles and the water-soluble resin (hereinafter referred to as "coating liquid A") and/or a basic liquid described below, and by applying the basic liquid (hereinafter referred to as "coating liquid B") having a pH value of 7.1 or more onto a coating layer, at either (1) the same time for forming the coating layer by applying coating liquid A; or (2) during the drying step of the coating layer formed by applying coating liquid A and also before the coating layer exhibits a decrease in the drying rate.

The cross-linking agent, for example, the boron compound is preferably added as follows. When the ink receiving layer is formed through curing by causing cross-inking of the coating layer by applying a coating liquid (coating liquid A) containing the fine particles and the water-soluble resin like polyvinyl alcohol, the layer is cured by cross-linking by applying the basic liquid (coating liquid B) having a pH value of 7.1 or more to the coating layer, either: (1) at the same time as forming the coating layer by applying the coating liquid A; or (2) during the drying step of the coating layer formed by applying coating liquid A and before the coating layer exhibits a decreasing drying rate. The boron compound acting as the cross-linking agent may be contained in either coating liquid A or coating liquid B, or alternatively may be contained in both the coating liquid A and coating liquid B.

The amount used of the cross-linking agent is preferably 1 to 50% by mass, and more preferably 5 to 40% by mass, relative to the amount of the water-soluble resin.

(Mordant)

The ink receiving layer of the invention preferably contains, as a mordant, at least one compound selected from polyallylamine and derivatives thereof, and polyvinylamine and derivatives thereof. These organic mordants may be contained as copolymers with other copolymerizable monomers. The polyallylamine for use in the invention refers to polymerized monoallylamines (including salts thereof).

The organic mordant preferably has a mass average molecular weight of 500 to 100,000 from the view point of preventing bleeding which develops with time and improving the ink absorbing ability of the ink receiving layer.

Usable polyallyamine and derivatives thereof include various known arylamine polymers and derivatives thereof. Examples of such derivatives include: salts between polyallylamine and acids (examples of the acid include inorganic acids such as hydrochloric acid, sulfuric acid, phosphoric acid and nitric acid, organic acids such as methanesulfonic acid, toluenesulfonic acid, acetic acid, propionic acid, cinnamic acid and (meth)acrylic acid, or combinations thereof and a partial salt of allylamine); derivatives obtained by polymerization of polyallylamine; and copolymers of polyallylamine and other copolymerizable monomers (examples of the monomer include (meth)acrylic acid esters, styrenes, (meth)acrylamides, acrylonitrile and vinyl esters).

While the structure of the polyallylamine derivatives is not particularly restricted, the polymer obtained as above is preferably water-soluble, or soluble in organic solvents miscible with water. However, the polyallylamine derivative may be used in the form of water dispersible latex particles.

Specific examples of polyallylamine and derivatives thereof include those described in JP-B Nos. 62-31722, 2-14364, 63-43402, 63-43403, 6345721, 63-29881, 1-26362, 2-56365, 2-57084, 4-41686, 6-2780, 645649, 6-15592 and 4-68622, Japanese Patent Nos. 3199227 and 3008369, JP-A Nos. 10-330427, 11-21321, 2000-281728, 2001-106736, 62-256801, 7-173286, 7-213897, 9-235318, 9-302026, 11-21321 and 5-140213, WO 99/21901 and WO 99/19372, and Japanese Patent Application National Publication (Laid-Open) No. 11-506488.

Various known polyvinylamines and derivatives thereof may be used in the invention. As derivatives have the same polyallylamine derivatives as described above can be used. Specific examples of the polyvinyl amine and derivatives thereof are the compounds described in JP-A Nos. 5-35162, 5-35163, 5-35164 and 588846, 7-118333 and 2000-344990, and Japanese Patent Nos. 2648847 and 2661677.

Polyallylamine and derivatives thereof are preferable among the above listed compounds.

The following mordants may be used together with the foregoing organic mordants in the invention for improving waterproofing and prevention of bleeding that occurs after a lapse of time in the image formed.

For the other mordants, cationic polymers (cationic mordants) as organic mordants or inorganic mordants are preferable. The mordant contained in the ink receiving layer renders the colorant to become stable, by an interaction between the mordant and liquid ink containing an anionic dye as the colorant, to thereby improve waterproofing of the image while preventing bleeding occurring after a lapse of time. Organic mordants and inorganic mordants each may be used alone, or organic mordants and inorganic mordants may be used in combinations.

The mordant is included such that a thickness from the surface of the ink receiving layer of the portion containing the mordant accounts for 10 to 60%, preferably 20 to 40%, of the total thickness of the receiving layer. Bleeding that occurs after a lapse of time may be increased when the proportion of the thickness is less than 10%, while the color density and ozone resistance may be decreased when the proportion exceeds 60%.

The method for adjusting the thickness of the portion containing the mordant may be arbitrarily selected, and may comprise, for example, either (1) forming a coating layer containing the fine particles and the water-soluble resin, followed by applying a mordant-containing solution; or (2) applying the coating liquid, containing the fine particles and the water-soluble resin, at the same time as the mordant-containing solution. Also, inorganic fine particles, water-soluble resin and cross-inking agent may be added to the mordant-containing solution.

While polymer mordants having primary, secondary or tertiary amino groups or quaternary ammonium salt groups are favorably used as the cationic mordant, cationic non-polymer mordants may also be used.

The polymer mordant is preferably obtained as: a homopolymer of a monomer (mordant monomer) having primary to tertiary amino groups or salts thereof, or quaternary ammonium salt groups; or a copolymer or condensed polymer of the mordant monomer and other monomers (hereinafter referred to as "non-mordant monomer"). These polymer mordants can be used in the form of water-soluble polymer or water dispersible latex particles.

Allylamine or diallyl amine, or derivatives or salts thereof may also be used. Examples of such compound include allylamine, allylamine hydrochloride, allylamine acetate, allylamine sulfate, diallylamine, diallylamine hydrochloride, diallylamine acetate, diallylamine sulfate, diallylmethylamine and salts thereof (e.g., hydrochloride, acetate and sulfate), diallylethylamine and salts thereof (e.g., hydrochloride, acetate and sulfate), and diallyldimethylammonium salts (with counter-ions such as chloride, acetate ion and sulfate ion). Since these allylamine and diallylamine derivatives are low in polymerizing ability in their free amine form, they are usually polymerized as salts followed by desalting, if necessary.

Polymers prepared by using N-vinylacetamide or N-vinylformamide units, and then converting into vinylamine units by hydrolysis after polymerization, and salts thereof, may be also used.

Non-mordant monomer as described above refers to a monomer that does not contain a basic or cationic moiety of primary to tertiary amines and salts thereof, or quaternary ammonium groups, and the non-mordant monomer exhibits no interaction, or, if any, a substantially small interaction with the dye in the inkjet ink.

In the inkjet recording medium a coating layer can be formed in advance by coating with a coating liquid consisting of fine particles, a water soluble resin and a first metal compound (first liquid). Then a further basic liquid, with a pH of 7.1 or above, containing a second metal compound (second liquid) can be applied. Here good film forming ability can be obtained and sufficient curable film can be obtained with the first metal compound and the second metal compound (and other mordant components) functioning as mordants. In doing so an inkjet recording medium can be obtained which carries out sufficient mordanting of ink to give images superior in print density and glossiness, with little occurrence of bleeding with the lapse of time.

The first metal compound contained in the first liquid is preferably an acidic metal compound, including polyvalent water-soluble metal salts and hydrophobic metal salt compounds. Specific examples thereof include salts and complexes of metals such as magnesium, aluminium, calcium, scandium, titanium, vanadium, manganese, iron, nickel, zirconium, copper, zinc, gallium, germanium, strontium, yttrium, molybdenum, indium, barium, lanthanum, cerium, praseodymium, neodymium, samarium, europium, gadolinium, dysprosium, erbium, ytterbium, hafnium, tungsten, and bismuth.

More specific examples thereof include calcium acetate, calcium chloride, calcium formate, zirconyl acetate, zirconium tetrachloride, calcium sulfate, barium acetate, barium sulfate, barium phosphate, manganese chloride, manganese acetate, manganese formate dihydrate, manganese ammonium sulfate hexahydrate, cupric chloride, cupric ammonium chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminium sulfate, aluminium alum, basic polyhydroxy aluminum, aluminum sulfite, aluminum thiosulfate, polychlorinated aluminum, aluminium nitrate nonahydrate, aluminium chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, zinc ammonium nitrate, zinc ammonium carbonate, titanium tetrachloride, tetraisopropyl titanate, titanium acetylacetonate, titanium lactate, chromium acetate, chromium sulfate, manganese sulfate, magnesium chloride hexahydrate, magnesium citrate nonahydrate, sodium phosphotungstate, sodium tungsten citrate, dodecatungstophosphoric acid n-hydrate, dodecatungstosilicic acid 26-hydrate, molybdenum chloride, dodecamolybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octoate, praseodymium nitrate, neodymium nitrate, samarium nitrate, europium nitrate, gadolinium nitrate, dysprosium nitrate, erbium nitrate, ytterbium nitrate, hafnium chloride, bismuth nitrate, and the like.

Among these compounds, aluminium sulfate, aluminium alum, basic polyhydroxy aluminum, aluminum sulfite, aluminum thiosulfate, polychlorinated aluminum, aluminium nitrate nonahydrate, aluminium chloride hexahydrate, zirconyl nitrate and zirconium terachloride are preferable.

It is preferable that for the first metal compound that 2 or more types of metal compound are included in the first liquid. Because the dyes which are mordanted by the metal compounds are different depending on the type of metal compound, if two or more types of metal compound are used as the first metal compound then the mordanting effect can be raised. Along with this, it is preferable to use metal compounds that are applicable to 2 or more dyes. Various combinations of metal compounds applicable to dyes are possible but, for example, in general for black dyes a zirconium metal compound is effective.

In general it is preferable that the amount of the first metal compound included in the first liquid is between 0.01% and 1% by mass relative to the total mass of the first liquid, and more preferably between 0.05% and 0.8%. If the amount of the first metal compound included is within the above ranges then an inkjet recording medium can be manufactured where curl under conditions of low humidity does not get worse, and there is little bleeding that occurs in the image with a lapse of time. In the case of use of the metal compound in conjunction with the other mordants described below, then these can be included and, as long as the total amount used is within the above ranges, then there is no detriment to the effectiveness of the invention.

There are no limits to the second metal compound included in the second liquid as long as it is stable under basic conditions. These metal compounds can be metal salts, metal complexes or inorganic oligomers or polymers. Preferable examples of inorganic mordants which can be used are described below. Amongst these, zirconium compounds, aluminum compound and zinc compounds are preferable, and zirconium compounds are particularly preferable. Example which can be given are zirconium ammonium carbonate, zirconium ammonium nitrate, zirconium potassium carbonate, zirconium ammonium citrate, zironyl stearate, zirconyl octoate, zirconyl nitrate, zirconium oxychloride, and zirconium hydroxychloride. Zirconium ammonium carbonate is particularly preferable. In the second liquid other mordant components described below can also be used, as appropriate.

Examples of the metal complex compounds which can be used are the metal complexes described in Survey of Chemistry, Quarterly 1981, No. 32, or the transition metal complexes, such as of the transition metal ruthenium, as described in Coordination Chemistry Review 1988, Vol. 84, pages 85 to 277 and Japanese Patent Application Laid-pen (JP-A) 2-182701.

In general it is preferable that the amount of the second metal compound included in the second liquid is between 0.1% and 0.8% by mass, relative to the total mass of the second liquid, and more preferably between 0.2% and 0.5%. If the amount of the second metal compound included is within the above ranges then bronzing does not deteriorate and the glossiness can be improved. In the case of use of the metal compound in conjunction with the other mordants described below, then these can be included and, as long as the total amount used is within the above ranges, then there is no detriment to the effectiveness of the invention.

For the second liquid, it is preferably to additionally include a basic compound. Examples which can be used for the basic compound are weakly acidic ammonium salts, weakly acidic alkali metal salts (such as lithium carbonate, sodium carbonate, potassium carbonate, lithium acetate, sodium acetate, potassium acetate), weakly acidic alkali earth metal salts (such as magnesium carbonate, barium carbonate, magnesium acetate, barium acetate), hydroxides of alkali metals and alkali earth metals, ammonia, primary to tertiary amines (such as ethylamine, dimethylamine, triethylamine, polyallylamine, tripropylamine, tributylamine, trihexylamine, dibutylamine, butylamine, N-ethyl-N-methylbutylamine), primary to tertiary anilines (such as diethylaniline, dibutylaniline, ethylaniline, aniline), pyridines which can be substituted (such as 2-aminopyridine, 3-aminopyridine, 4-aminopyridine, 4-(2-hydroxyethyl)-aminopyridine). Weakly acidic ammonium salts are particularly preferable.

By "weakly acidic" above is meant organic acids or inorganic acids with a pKa value of 2 or above, as described, for example, in Kagaku Binrankiso II (Chemical Handbook) (published by Maruzen). Examples of weakly acidic ammonium salts are ammonium carbonate, ammonium hydrogen carbonate, ammonium borate, ammonium acetate. However, the invention is not limited to these examples. Preferable among these are, ammonium carbonate, ammonium hydrogen carbonate, and ammonium carbamate, since they have the effect of being able to reduce ink bleeding and do not remain in the layer after drying. The basic compounds can be used in combinations of two or more.

The amount of the basic compound included in the second liquid is preferably 0.5% to 10% by mass, relative to the total mass of the second liquid. Particularly when the amount of the basic compound used is within the above ranges then sufficient degree of curing can be obtained, and since the concentration of ammonium is not too high, there is no detriment to the working environment.

The ink receiving layer may contain a phenolic compound. In this case, an organic acid or an inorganic acid may be added. The acid may be previously mixed with the phenolic compound, or mixed by coating at the same time as coating with the solution containing the phenolic compound, or coating later.

The pH value of the surface of the ink receiving layer is adjusted to between pH 3 to 8, and preferably between pH 5 to 7.5. This is preferable because in doing so there is an improvement in the yellowing resistance of the white portions. The surface pH may be determined according to the A method (coating method) for measurement of surface pH specified by the Japanese Technical Association of the Pulp and Paper Industry (J.TAPPI). This may be done by using, for example, a pH-measuring set "model MPC" for determining the pH of paper surfaces, manufactured by KYORITSU CHEMICAL-CHECK Lab., Corp., which complies with the A method.

—Other Components—

The sheet like material according to the invention may additionally contain, if necessary, various additives known in the art such as ultraviolet absorber, antioxidant, optical brightening agent, monomer, polymerization initiator, polymerization inhibitor, anti-bleeding agent, preservative, viscosity stabilization agent, anti-foamer, surfactant, anti-static agent, matting agent, anti-curl agent, waterproofing agent, and the like.

Other ingredients may be used alone or in combinations of two or more thereof. Other ingredients may be added by being dissolved in water, as dispersions, polymer dispersions, emulsification or by forming into oil droplets, or may be encapsulated in micro-capsules. The adding amount of other ingredients is preferably in the range of 0.01 to 10 $g/m^2$.

The surface of the inorganic fine particles may be treated with a silane coupling agent to improve the dispersibility of the inorganic fine particles. The silane coupling agent preferably has organic functional groups (such as vinyl, amino, epoxy, mercapto, chloro, alkyl, phenyl and ester groups) in addition to the moiety involved in such a coupling treatment.

In the invention, the coating liquid for the ink receiving layer preferably contains a surfactant. Any surfactants, such as cationic, anionic, nonionic, amphoteric, fluorine-type and silicon-type surfactants may be used.

Examples of the nonionic surfactants include polyoxyalkylene alkylethers and polyoxyalkylene alkylphenyl ethers (e.g., diethylene glycol monoethylether, diethylene glycol diethylether, polyoxyethylene laurylether, polyoxyethylene stearylether, polyoxyethylene nonylphenylether, and the like); oxyethylene-oxypropylene block copolymers; sorbitan aliphatic esters (e.g., sorbitan monolaurate, sorbitan monooleate, sorbitan trioleate, and the like); polyoxyethylene sorbitan aliphatic esters (e.g., polyoxyethylene sorbitan monolaurate, polyoxyethylene sorbitan monooleate, polyoxyethylene sorbitan trioleate, and the like); polyoxyethylene sorbitol aliphatic esters (e.g., polyoxyethylene sorbit tetraoleate and the like); glycerin aliphatic esters (e.g., glycerol monooleate and the like); polyoxyethylene glycerin aliphatic esters (polyoxyethylene glycerol monostearate, polyoxyethylene glycerol monooleate, and the like); polyoxyethylene aliphatic esters (polyethylene glycol monolaurate, polyethylene glycol monooleate, and the like); polyoxyethylene alkylamines; acetylene glycols (e.g., such as 2,4,7,9-tetramethyl-5-decyne-4,7-diol, and ethylene oxide and propylene oxide adducts of the diol); and the like. Polyoxyalkylene alkylethers are preferable. The nonionic surfactant may be contained in the coating liquid for ink receiving layer.

The amphoteric surfactants include amino acid-type, carboxy ammonium betaine-type, sulfone ammonium betaine-type, ammonium sulfate ester betaine-type, imidazolium betaine-type, and other surfactants. For example, the amphoteric surfactants described in U.S. Pat. No. 3,843,368, JP-A Nos. 5949535, 63-236546, 5-303205, 8-262742, and 10-282619, and the like may be favorably used. Amino acid-type amphoteric surfactants are preferable as the amphoteric surfactant. Examples of the amino acid-type amphoteric surfactants include those described in JP-A No. 5-303205, i.e., N-acylamino acids having a long chain acyl group and the salts thereof, which are derived from amino acids (such as glycine, glutamic acid, and histidine acid).

Examples of the anionic surfactants include aliphatic acid salts (e.g., sodium stearate, potassium oleate), alkyl sulfate ester salts (e.g., sodium lauryl sulfate, triethanolamine lauryl sulfate), sulfonate salts (e.g., sodium dodecylbenzenesulfonate), alkyl sulfosuccinate salts (e.g., sodium dioctyl sulfosuccinate), alkyl diphenyletherdisulfonate salts, alkyl phosphate salts, and the like.

Examples of the cationic surfactants include alkylamine salts, quaternary ammonium salts, pyridinium salts, imidazolium salts, and the like.

The fluorinated surfactants include derivative compounds prepared via an intermediate having a perfluoroalkyl group by means of electrolytic fluorination, telomerization, oligomerization or the like. Example of these compounds include perfluoroalkyl sulfonate salts, perfluoroalkyl carboxylate salts, perfluoroalkyl ethylene oxide adducts, perfluoroalkyltrialkylammonium salts, perfluoroalkyl group-containing oligomers, perfluoroalkyl phosphate esters, and the like.

Silicone oils modified with organic groups are preferable as the siliconated surfactant. The siliconated surfactants obtained may have a siloxane structural unit having the side-chain modified with an organic group, or one or both ends of the surfactant modified therewith. The organic group modification includes amino modification, polyether modification, epoxy modification, carboxyl modification, carbinol modification, alkyl modification, aralkyl modification, phenol modification, fluorine modification, and the like.

The content of the surfactant in the coating liquid for the ink receiving layer is preferably between 0.001% and 2.0% and more preferably 0.01 to 1.0% by mass.

The ink-receiving layer of the inkjet recording medium is preferably provided by forming a coating layer by applying, on the surface of the support, a coating liquid containing the fine particles and the water-soluble resin, and by adding a cross-inking agent in the coating liquid and/or basic liquid described below (wet-on-wet method). The coating layer is hardened by applying the basic liquid with a pH of 7.1 more to the coating liquid either (1) at the same time as forming the coating layer; or (2) during the drying step of the coating layer and before the coating layer exhibits a decrease in drying rate. The cross-linking solution capable of cross-inking the water-soluble resin is preferably added to one or both of the coating liquid and the basic liquid. Providing the ink receiving layer hardened by cross-linking is preferable to improve ink absorbance and prevent cracking of the layer.

A mordant is incorporated in the layer so that the thickness at the mordant-containing portion from the surface of the receiving layer accounts for 10 to 60% of the total thickness of the receiving layer. The mordant-containing portion is formed, for example, by any of the following methods comprising (1) forming the coating layer containing the fine particles, the water-soluble resin and the cross-inking agent, followed by applying a mordant-containing solution onto the resultant coating layer; and (2) applying the coating liquid, containing the fine particles and the water-soluble resin, at the same time as the mordant-containing solution. Inorganic fine particles, water-soluble resin and cross-inking agents may be contained in the mordant-containing solution.

The foregoing methods for forming the mordant-containing layer are preferable since the inkjet colorant can be sufficiently fixed by the action of the mordant, that is mainly distributed in a given portion of the ink receiving layer, thereby improving color density, bleeding which develops with a lapse of time, glossiness of printed parts, water resistance of characters and images after printing, and ozone resistance. A portion of the mordant may be included in a layer initially provided on the support, and in this case the subsequently applied mordant may be the same as or different from the first mordant.

The coating liquid (coating liquid A) for the ink receiving layer containing fine particles (e.g., vapor phase silica) and water-soluble resin (e.g., polyvinyl alcohol) is prepared in the following manner.

The coating liquid is prepared by adding the fine particles, such as vapor phase silica, and a dispersing agent to water (for example, to a silica fine particle concentration in water of 10 to 20% by mass), dispersing the fine particles using a high speed rotational wet-type colloid mill (such as trade name: Clearmix, manufactured by M Technique Co., Ltd.) at a high speed rotation of 10,000 rpm (preferably, at 5,000 to 20,000 rpm) for 20 minutes (preferably, for 10 to 30 minutes), adding an aqueous polyvinyl alcohol (PVA) solution (to make the PVA concentration become about ⅓ of the concentration of the vapor phase silica), and dispersing under the same conditions as described above. Preferably, for stabilizing the coating liquid, the pH of the solution is adjusted to about pH of 9.2 with an aqueous ammonia, or a dispersing agent is used. The thus obtained coating liquid is in the state of a sol, and a porous ink receiving layer having a three-dimensional network structure can be formed by applying the solution onto the support, followed by drying.

Dispersing machines used for obtaining the aqueous dispersion solution include various known dispersing machines such as a high speed rotational dispersing machine, medium agitating-type dispersing machines (such as a ball mill and a sand mill), ultrasonic dispersing machine, colloid mill dispersing machine and high pressure dispersing machine. However, the medium agitating-type dispersing machine, colloid mill dispersing machine and high pressure dispersing machine are preferable for efficiently dispersing clumps of the fine particles.

Water, organic solvents and mixed solvents thereof may be used as the solvent in each step. Examples of organic solvents used for preparing a coating liquid include alcohols, such as methanol, ethanol, n-propanol, i-propanol and methoxypropanol, ketones such as acetone and methylethyl ketone, tetrahydrofuran, acetonitrile, ethyl acetate and toluene.

Cationic polymers may be used as the dispersing agent. Examples of cationic polymers include those described as mordants. A silane coupling agent is also preferably used as a dispersing agent.

The proportion of the dispersing agent added relative to the fine particles is preferably between 0.1% to 30%, and more preferably 1 to 10%.

The coating liquid of the ink receiving layer can be applied by any known method such as using an extrusion die coater, an air doctor coater, a blade coater, a rod coater, a knife coater, a squeeze coater, a reverse roll coater, and a bar coater.

While the basic liquid (coating liquid B) may be applied onto the coating layer at the same time as or after applying the coating liquid for the ink receiving layer (coating liquid A), however it is preferable to apply the coating liquid B before the coating exhibits a reduction in the drying rate. In other words, the ink receiving layer is favorably manufactured by introducing the coating liquid B during the period before the coating layer exhibits a reduction in the rate of drying after applying the coating liquid for the ink receiving layer (coating liquid A). A mordant may be added to the coating liquid B.

The phrase "before the coating layer exhibits a reduction in the rate of drying" usually means a process undertaken within several minutes from applying the coating liquid of the ink receiving layer. This period of time is the period in which the content of the solvent (dispersing medium) in the applied coating liquid decreases in proportion to the lapse of time (a constant rate of drying). The time period exhibiting "constant rate of drying" is described, for example, in Kagaku Kogaku Binran (Chemical Engineering Handbook), pp. 707-712, Maruzen Co. Ltd., 25 Oct., 1980.

The coating layer is dried until it exhibits a reduction in the rate of drying after applying coating liquid A, the drying process is usually performed at 40 to 180° C. for 0.5 to 10 minutes (preferably, 0.5 to 5 minutes). While the drying time is different depending on the amount of coating, the aforementioned range is usually appropriate.

Examples of methods for applying the coating liquid before the first coating layer exhibits a reduction in the rate of drying include (1) further applying coating liquid B on the coating layer, (2) spraying coating liquid B, and (3) dipping the support on which the coating layer has been disposed in coating liquid B.

The method used for applying coating liquid B in the above method (1) includes known application methods using, for example, a curtain flow coater, an extrusion die coater, an air doctor coater, a blade coater, a rod coater, a knife coater, a squeeze coater, a reverse roll coater and a bar coater. The extrusion die coater, curtain flow coater or bar coater are preferably used to prevent the coater from contacting with the already formed first coating layer.

The coating layer is normally dried and hardened after applying coating liquid B by heating at 40 to 180° C. for 0.5 to 30 minutes. Heating at 40 to 150° C. for 1 to 20 minutes preferable.

When the basic liquid (coating liquid B) is applied at the same time as applying the coating liquid (coating liquid A) for the ink receiving layer, coating liquids A and B are provided at the same time on the support, in such a way that coating liquid A contacts the support, (multiple-layer coating), and then the solutions are dried to thereby form the ink receiving layer.

Coating methods using, for example, an extrusion die coater or a curtain flow coater may be employed for the simultaneous application (multilayer coating). While the coated layers are dried after the simultaneous coating, these layers are usually dried by heating at 40 to 150° C. for 0.5 to 10 minutes, and preferably by heating at 40 to 100° C. for 0.5 to 5 minutes.

When the coating liquids are applied at the same time (multiple-layer coating) using, for example, an extrusion die coater, the two coating liquids ejected at the same time are laminated near the outlet of the extrusion die coater, in other words immediately before the solutions are transferred onto the support, and are laminated on the support in this condition to make a stratified coating layer. Since the two layers of the coating liquids laminated before application tend to cause cross-inking at the interface between the two solutions when the solutions are transferred onto the support, the supplied two solutions readily become viscous by being mixed with each other in the vicinity of an outlet of the extrusion die coater, occasionally leading to trouble in the coating operation. Accordingly, it is preferable to arrange simultaneous triple layers by presenting a barrier layer solution (intermediate layer solution) between the solution A and solution B at the same time as applying the coating liquids A and B.

The barrier layer solution may be selected without any particular restrictions. For example, the solution may be an aqueous solution containing a small amount of the water-soluble resin, or water. Since the water-soluble resin is used for increasing the viscosity in consideration of the ease of applying the solution, examples of the resin include cellulose resins (such as hydroxypropyl cellulose, methyl cellulose and hydroxyethylmethyl cellulose), polyvinyl pyrrolidone and gelatin. A mordant may be incorporated in the barrier layer solution.

The ink receiving layer may be subjected to calender treatment by allowing the layer to pass through nip-rolls under pressure and heat using, for example, a super calender or cross calender for improving surface smoothness, luster, transparency and coating layer strength. However, since the calender treatment may decrease the void percentage (in other words since it can decrease the ink absorbancy), the conditions for calendering should be adjusted to avoid a decrease in the void percentage.

The roll temperature for carrying out calender treatment is preferably 30 to 150° C., and more preferably 40 to 100° C.

The linear pressure between the rolls for performing the calender treatment is preferably 50 to 400 kg/cm, and more preferably 100 to 200 kg/cm.

In a layer for inkjet recording, the thickness of the ink receiving layer should be selected in view of the void percentage, since the layer is required to exhibit an absorption capacity capable of absorbing all the ink droplets. For example, a thickness of about 15 μm or more is necessary when the amount of the ink applied is 8 nl/$mm^2$ and the void percentage is 60%.

In consideration of these conditions, the thickness of the ink receiving layer is preferably 10 to 50 μm for inkjet recording.

The median pore diameter of the ink receiving layer is preferably 0.005 to 0.030 μm, and more preferably 0.01 to 0.025 μm.

The void percentage and the median diameter of the pores can be measured using a mercury porosimeter (trade name: Pore Sizer 9320-PC2, manufactured by Shimadzu Corp.).

Since the ink receiving layer preferably has excellent transparency, the haze value indicative of transparency is preferably 30% or less, and more preferably 20% or less, when the ink receiving layer is formed on a transparent film substrate.

The haze value can be measured using a haze meter (trade name: HGM-2DP, manufactured by Suga Test Instrument Co., Ltd.).

Polymer fine particles may be incorporated in the constituting layers of the inkjet recording medium of the invention (for example the ink receiving layer or a back-coat layer). The polymer fine particle dispersion is used to improve the layer characteristics such as dimensional stability, curl prevention, adhesion prevention and crack prevention. Polymer fine particle dispersions are described in JP-A Nos. 62-245258, 62-1316648 and 62-110066. The layer can be prevented from cracks and curling if polymer fine particles having a low glass transition temperature (40° C. or less) are incorporated in the layer containing the mordant. The prevention of curling may also be achieved by adding polymer fine particle dispersions having a high glass transition temperature to a back-coat layer.

Image recording media other than an inkjet recording medium will now be explained.

—Electrophotographic Image Receiving Materials—

The electrophotographic image receiving materials have a support body for an image recording medium, and on at least one of the surfaces of the support body at least one toner receiving layer (image recording layer), and other appropriate layers selected as required. For example, a surface protection layer, intermediate layer, undercoat layer, cushion layer, electrostatic adjustment (prevention) layer, reflective layer, color tint adjustment layer, preservability improvement layer, adhesion prevention layer, anti-curl layer, and/or a smoothing layer. Each of these layers can be single layer structures or laminate structures.

—Silver Salt Photographic Photosensitive Materials—

As silver salt photographic photosensitive materials are materials which have a construction with, for example, a support body for use as an image recording medium, and at least photo sensitive layer(s) thereon for developing the colors YMC (image recording layer). These silver halogen photographic sheets when they have been printing-exposed are passed through, and dipped in, multiple treatment tanks, and in doing so color images are developed, which are bleach-fixed, and washed, and dried to obtain a silver halide photographs.

—Thermal Transfer Image Receiving Materials—

As thermal transfer image receiving materials are thermo autochrome type (TA type), thermo-sensitive color developing recording materials which have a construction such as, for example, a support body for use as an image recording medium, and at least a thermal color developing layer(s) thereon. Then processing cycles are carried out, of applying heat using a thermal head and fixing with UV light, in order to form images.

—Thermosenstive Color-Developing Recording Materials—

As thermosensitive color-developing recording materials are materials which have a construction such as, for example, a support body for use as an image recording medium, with at least a thermal fusion ink layer (image recording layer) formed thereon, wherein heat is applied by using a thermal head to the thermal fusion ink layer, and then ink is fusion transferred from that layer to an image receiving sheet for use with thermal transfer recording.

—Sublimation Transfer Image Receiving Materials—

As sublimation transfer image receiving materials, there are materials suitable for sublimation transfer type processes, with a construction of, for example, a support body for use as an image recording medium with at least an ink layer (image recording layer) including a thermal diffusion dye (sublimation dye), wherein heat is applied to the ink layer using a thermal head, and thermal diffusion dyes are transferred onto a thermosensitive transfer recording image receiving sheet.

Also, by using similar methods to those used in the manufacture of the inkjet recording medium above, electrophotographic image receiving materials, thermal coloring recording materials, sublimation transfer image receiving materials, thermal transfer image receiving materials, and silver photographic materials can be manufactured in which an image recording layer (toner receiving layer, thermal fusion ink layer, ink layer, thermal coloring layer or photosensitive layer) appropriate to each of the materials is provided onto an undercoating layer.

EXAMPLES

The invention will now be explained with reference to specific Examples below, however the invention is not limited by these examples. In the Examples "parts", and "%" refer to parts by mass or mass %, and "degree of polymerization" refers to the weight average degree of polymerization, unless otherwise stated.

Example 1

Support Body Manufacture 50 parts of LBKP derived from acacia and 50 parts of LBKP derived from aspen are each processed by beating in a disc refiner until the Canadian freeness is 300 ml.

To the obtained pulp slurry is added, relative to the pulp, 1.3% of cationic starch (trade name:CATO 304L; manufactured by National Starch and Chemical Japan), 0.15% anionic polyacrylamide (trade name: DA 4104, manufactured by Seiko PMC Corporation), 0.29% alkyl ketene dimer (trade name: SIZEPINE K, manufactured by Arakawa Chemical Industries), 0.29% epoxidated behenic acid amide, and 0.32% polyamide-polyamine-epichlorohydrine (trade name: ARAFIX 100; manufactured by Arakawa Chemical Industries). Following that 0.12% of an anti-foaming agent is added.

The above prepared pulp slurry is then made into paper using a Fourdrinier paper machine, and in a drying process the felt surface of the web is pressed against a drum dryer via a dryer canvas, with the dryer canvas tension adjusted to 1.6 kg/cm. After drying, the base paper is size pressed on both surfaces with polyvinyl alcohol (trade name:L-115; manufactured by Kuraray Company Ltd.) coated at rate of 1 $g/m^2$, dried, and calender processed. The base paper manufactured has a basis weight of 166 g/m and a base paper with a thickness of 160 μm is obtained.

After undertaking corona electrical discharge treatment of the wire surface (back surface) of the substrate paper, the surface is coated to a thickness of 25 μm with high density polyethylene using an extrusion machine, and the thermoplastic resin layer is formed on what was the matt surface (from now on this thermoplastic resin layer surface will be referred to as the 'back surface'). Further corona electrical discharge treatment is carried out on this back surface. Then, as an anti-static agent, aluminium oxide (trade name: Aluminasol 100; manufactured by Nissan Chemical Industries Ltd) and silicon dioxide (trade name: Snowtex 0; manufactured by Nissan Chemical Industries Ltd) at a mass ratio of 1:2 is dispersed in water to form a treatment liquid and coated to a dry weight of 0.2 $g/m^2$.

In addition, on the felt surface (face surface), the side which has not been provided with a thermoplastic resin layer, after undertaking corona electrical discharge treatment a high gloss thermoplastic resin is formed on the face surface of the substrate paper (from now this high gloss thermoplastic resin layer surface is referred to as the "front surface") to a thickness of 25 μm at a MFR (melt flow rate) of 3.8 using an extrusion machine with low density polyethylene which has been adjusted by adding anatase titanium dioxide to a quantity of 10%, ultramarine manufactured by Tokyo Ink to 0.3%, and further adjusted with 0.08% of optical brightening agent (trade name:Whiteflour PSN conc.; manufactured by Nippon Chemical Industrial Company Ltd.). The width of the support body so prepared is 1.5 m and the wound length is 3000 m.

(Preparation of the Coating Liquid for Forming the Ink Receiving Layer)

From the components described below the (1) vapor-phase silica fine particles, (2) ion exchange water, (3) Shallol DC902P, were mixed and, using a dispersing machine (trade name:KD-P; manufactured by Shimaru Enterprises Corp.), dispersed. After dispersion, a liquid including the below described (4), polyvinyl alcohol (water soluble resin), (5) boric acid, (6) polyoxyethylene lauryl ether, and (7) ion exchange water was added to form the ink receiving layer coating liquid. Here, the mass ratio of the silica fine particles to the water soluble resin (PB ratio of (1):(4)) is 4.5:1, and an acidic ink receiving layer coating liquid with a pH value of 3.5 is recorded.

| <Compositions for the ink receiving layer coating liquid> | |
|---|---|
| vapor-phase silica fine particles (inorganic fine particles) (trade name: REOLOSIL QS30; manufacturer Tokuyama Corporation; average primary diameter 7 nm) | 10 parts |
| (2) ion exchange water | 51.6 parts |
| (3) Dispersing agent 51.1% solution (trade name: Shallol DC-902P; manufactured by Daiichi Kogyo Seiyaku) | 1 part |
| (4) Polyvinyl Alcohol 8% solution (water soluble resin) (trade name: PVA124; manufactured by Kuraray Company; Degree of saponification 98.5%; degree of polymerization 2400;) | 27.8 parts |
| (5) Boric Acid (cross-linking agent) | 0.4 parts |
| (6) Polyoxyethylene laurylether (surfactant) (Trade name: EMULDEN 109P; manufacturer Kao Corporation; 10% solution, HLB value 13.6) | 1.2 parts |
| (7) Ion exchange water | 33.0 parts |

(Long Roll Body Production)

Onto the front surface of the support body prepared as above is coated, using a extrusion coater, the coating for the ink receiving layer obtained above at a rate of 200 ml/m$^2$ (coating process). This is then dried until the solid content of the coating layer is 20% using a heated drying machine at 80° C. (air speed between 3 and 8 n/s). This coated layer exhibits a constant rate of drying during this period. Immediately afterwards, the mordant solution of the composition described below is applied onto the coating layer and allowed to soak in for a period of 10 seconds to achieve an application rate of 20 g/m$^2$ (mordant liquid application process). Then further drying is carried out at 80° C. for 10 minutes (drying process). As a result of this an ink receiving layer (recording layer) is coated giving a dry film thickness of 32 μm. This sheet like material, suitable for use as a inkjet recording medium, is the same size as the above support body (width 1.5 m, roll length 3000 m), and is wound with the face surface on the outside to form the long roll body. The long roll body obtained is stored for 2 weeks at normal humidity and temperature.

| <Composition of the mordant liquid> | |
|---|---|
| (1) Boric acid (cross-linking agent) | 0.65 parts |
| Polyallylamine 20% solution (mordant) (Trade name: PAA-03; manufactured by Nittobo Corporation) | 12.5 parts |
| (3) Ion exchange water | 72.0 parts |
| (4) Ammonium Chloride (surface pH regulator) | 0.8 parts |
| (5) Polyoxyethylene laurylether (surfactant) 2% solution (Trade name: EMULGEN 109P; manufacturer Kao Corporation; HLB value 13.6) | 10 parts |
| (6) Fluoro surfactant 10% solution (Trade name: MEGAFAC F1405; manufactured by Dai Nippon Ink) | 2 parts |

Inkjet Recording Sheet (Medium) Production

The long roll body is kept for a period of 2 weeks at normal humidity and temperature and then cut using the image recording medium manufacturing apparatus 12 as illustrated in FIG. 1. Using this inkjet recording sheets of A6 size can be obtained. In the image recording medium manufacturing apparatus 12 the straightening device 46 uses a decurling bar 80 with a free roller of diameter 12 mm. The wrap angle between the long roll body web 18 and the decurling bar 80 is 55 degrees, and it is conveyed with a tension of 40 kg/m.

Example 2

In Example 2 an inkjet recording sheet is obtained, produced in exactly the same way as the production of the inkjet recording sheet in Example 1, except in that a decurling bar 80 using a free roller of 8 mm diameter is used.

Example 3

In Example 3 an inkjet recording sheet is obtained, produced in exactly the same way as the production of the inkjet recording sheet in Example 1, except in that a decurling bar 80 using a free roller of 16 mm diameter is used.

Example 4

In Example 4 an inkjet recording sheet is obtained, produced in exactly the same way as the production of the inkjet recording sheet in Example 1, except in that a conveying tension of 10 kg/m is used.

Example 5

In Example 5 an inkjet recording sheet is obtained, produced in exactly the same way as the production of the inkjet recording sheet in Example 1, except in that a conveying tension of 90 kg/m is used.

Example 6

In Example 6 an inkjet recording sheet is obtained, produced in exactly the same way as the production of the support body in Example 1, except in that the thickness of the high density polyethylene coating on the back surface of the support paper is made 23 μm.

Example 7

In Example 7 an inkjet recording sheet is obtained, produced in exactly the same way as the production of the support body in Example 1, except in that the thickness of the high density polyethylene coating on the back surface of the support paper is made 35 μm, and the ink receiving layer is made with a dry thickness of 20 μm.

Example 8

In Example 8 an inkjet recording sheet is obtained, produced in exactly the same way as the production of the support body in Example 1, except in that the basis weight of the base paper is made 114 g/m$^2$, and the thickness 110 μm, the thickness of the high density polyethylene coating on the back surface of the base paper is made 45 μm, and further the low density polyethylene extruded by a melt extrusion machine on the front surface of the support paper is made 50 μm.

Example 9

In Example 9 an inkjet recording sheet is obtained, produced in exactly the same way as the production of the support body in Example 1, except in that the thickness of the high density polyethylene coating on the back surface of the support paper is made 23 μm, the low density polyethylene extruded by a melt extrusion machine on the front surface of the support paper is made 16 μm, and further the ink receiving layer is made with a dry thickness of 40 μm.

Example 10

In Example 10 an inkjet recording sheet is obtained, produced in exactly the same way as the production of the support body in Example 1, except in that the thickness of the high density polyethylene coating on the back surface of the support paper is made 20 μm.

Example 11

In Example 11 an inkjet recording sheet is obtained, produced in exactly the same way as the production of the support body in Example 1, except in that the thickness of the high density polyethylene coating on the back surface of the support paper is made 40 μm.

Example 12

In Example 12 an inkjet recording sheet is obtained, produced in exactly the same way as the production of the support body in Example 1, except in that the thickness of the low density polyethylene coating on the front surface of the support paper is made 14 μm.

Example 13

In Example 13 an inkjet recording sheet is obtained, produced in exactly the same way as the production of the support body in Example 1, except in that LBKP from acacia and LBKP from aspen were used in quantities of 28 parts and 72 parts respectively.

Example 14

In Example 14 an inkjet recording sheet is obtained, produced in exactly the same way as the production of the support body in Example 1, except in that in the preparation of the ink receiving layer coating liquid for coating the support body, the ink receiving layer coating liquid B as described below is used and the long roll is body is produced as described below.

Ink Receiving Layer Coating Liquid B Preparation

In order to prepare the ink receiving layer coating liquid B the components (1) vapor-phase silica fine particles, (2) ion exchange water, (3) Shallol DC-902P, and (4) ZA-30 from those listed below are mixed together, and dispersed using a dispersing machine (trade name:KD-P; manufactured by Shimaru Enterprises Corp.). After dispersion, the dispersion liquid is held at 45° C. for 20 hours. Then to the liquid the below described (5) boric acid, (6) polyvinyl alcohol (water soluble resin) solution, (7) SUPERFLEX 600, (8) polyoxyethylene lauryl ether, (9) ethanol are added, at 30° C.

Here, the mass ratio of the silica fine particles to the water soluble resin (PB ratio=(1):(6)) is 4.5:1, and an acidic ink receiving layer coating liquid B with a pH value of 3.9 is recorded.

| <Compositions for the ink receiving layer coating liquid B> | |
|---|---|
| (1) vapor-phase silica fine particles (inorganic fine particles) (trade name: AEROSIL 300S F75; manufacturer Aerosil Japan Corporation) | 10 parts |
| (2) ion exchange water | 64.8 parts |
| dispersing agent 51.1% solution (trade name: SHALLOL DC-902P; manufactured by Daiichi Kogyo Seiyaku) | 0.87 parts |
| (4) $ZrO(C_2H_3O_2)_2$ (trade name: ZIRCOSOL ZA-30, manufactured by Daiichi Kigenso Kagaku Kogyo Co. Ltd) | 0.54 parts |
| (5) Boric Acid (cross-linking agent) | 0.37 parts |
| (6) Polyvinyl alcohol as described below (water soluble resin) | 29.4 parts |
| (7) Water-dispersed polyurethane (trade name: SUPERFLEX 600; manufactured by Dalichi Kogyo Seiyaku) | 1.2 parts |
| (8) Polyoxyethylene laurylether (surfactant) 10% solution (Trade name: EMULGEN 109P; manufacturer Kao Corporation; HLB value 13.6) | 0.49 parts |
| (7) Ethanol | 2.5 parts |
| Polyvinyl alcohol composition | |
| Polyvinyl alcohol (Trade name: PVA320; manufactured by Kuraray Company Ltd; degree of saponification 88%, degree of polymerization 3500) | 2 parts |
| Polyoxyethylene laurylether (surfactant) 10% solution (Trade name: EMULGEN 109P; manufacturer Kao Corporation; HLB value 13.6) | 0.03 parts |
| Compound 1 listed below | 0.06 parts |
| Ethylene glycol monobutylether (Trade name: BUTYSONOL 20P manufactured by Kyowa Chemical Co. Ltd) | 0.68 parts |
| Ion exchange water | 26.6 parts |

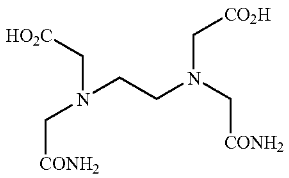

Compound 1

Long Roll Body Production

Onto the front surface of the support body prepared as above is coated, using a extrusion coater, the coating for the ink receiving layer obtained above at a rate of 173 ml/m$^2$, then on top of this a solution of polychloride aluminum (Trade name: ALUFINE 83; manufactured by Taimei Chemicals Co. Ltd.) diluted 5 fold with water is coated using inline coating with a speed of 10.8 ml/m$^2$ (coating process). This is then dried until the solid content of the coating layer is 20% using a heated drying machine at 80° C. (air speed between 3 and 8 n/s). This coated layer exhibits a constant rate of drying during this period. Immediately afterwards, the basic liquid of the composition described below is applied to the ink receiving layer and allowed to soak in for a period of 10 seconds to achieve an application rate of 13 g/$m^2$ (basic liquid application process). Then further drying is carried out at 80° C. for 10 minutes (drying process). As a result of this an ink receiving layer (recording layer) is coated giving a dry film thickness of 32 μm. This sheet like material, suitable for use as a inkjet recording medium, is the same size as the above support body (width 1.5 m, roll length 3000 m), and is wound with the face surface on the outside to form the long roll body. The long roll body obtained is stored for 2 weeks at normal humidity and temperature.

| Basic liquid composition | |
|---|---|
| (1) Boric acid (binding agent) | 0.65 parts |
| (2) Zirconyl ammonium carbonate (28% solution) (trade name: ZIRCOSOL AC-7, manufactured by Daiichi Kigenso Kagaku Kogyo Co. Ltd) | 2.5 parts |
| (3) Ammonium carbonate (1st Grade, Kanto Kagaku) | 3.5 parts |
| (4) Ion exchange water | 63.3 parts |
| (5) Polyoxyethylene laurylether (surfactant) 2% solution (Trade name: EMULGEN 109P; manufacturer Kao Corporation; HLB value 13.6) | 30.0 parts |

Comparative Example 1

In Comparative Example 1 an inkjet recording sheet is obtained, produced in exactly the same way as the production of the inkjet recording sheet in Example 1, except in that a decurling bar 80 using a free roller of 6 mm diameter is used.

Comparative Example 2

In Comparative Example 2 an inkjet recording body is sheet, produced in exactly the same way as the production of the inkjet recording sheet in Example 1, except in that a decurling bar 80 using a free roller of 24 mm diameter is used.

Comparative Example 3

In Comparative Example 3 an inkjet recording body is sheet, produced in exactly the same way as the production of the inkjet recording sheet in Example 1, except in that a wrap angle of the long roll body web 18 and the decurling bar 80 of 65 degrees is used.

Comparative Example 4

In Comparative Example 4 an inkjet recording sheet is obtained, produced in exactly the same way as the production of the inkjet recording sheet in Example 1, except in that, when making the long roll body, the long roll body with the ink receiving layer is wound so that the back surface is on the outside (the front surface is on the inside).

Evaluation and Testing

A6 size samples of inkjet recording sheets of Examples 1 to 14 and Comparative Examples 1 to 4 were subjected to the following evaluations and testing. The evaluation results are shown in Tables 1A and 1B.

Cracking of the Ink Receiving Layer 1000 sheets of the inkjet recording sheets where visually inspected and the ink receiving layers where evaluated in line with the following criteria:

A: No cracking at all of the ink receiving layer discernable

B: Only very slight cracking of the ink receiving layer detected

C: Cracking of the ink receiving layer detected

Curl Tendency

The inkjet recording sheets obtained were placed with the ink receiving surface face-up, and kept for 24 hours under each of conditions of 23° C. and 60% RH, and 10° C. and 20% RH. The curl side was placed face-down on a flat surface, and the height of the raised corners was measured, and the curl tendency was evaluated in line with the following criteria. Here, where the side of the ink receiving layer is an out curl the designation is "−" and when the side of the ink receiving layer an in curl the designation is "+".

A: Good curl—After both holding for 24 hours at 23° C. 60% RH and holding for 24 hours at 10° C. and 20% RH then both samples are between −4 mm and +2 mm B: High humidity good curl—After holding for 24 hours at 23° C. 60% RH the samples are between −4 and +2 mm; and after holding for 24 hours at 10° C. and 20% RH there is one or more place where the curl is outside of the range −4 mm to +2 mm C: Bad curl—After both holding for 24 hours at 23° C. 60% RH and holding for 24 hours at 10° C. and 20% RH there is one or more place in both samples where the curl is outside of the range −4 mm to +2 mm Inkjet Printer Feedability Images of landscapes and people were printed on the obtained inkjet recording sheets using an inkjet printer (trade name: PM970C; manufactured by Seiko Epsom Corporation. Feedability was evaluated according to the following criteria.

A: Absolutely no ink smudging discernable on the image portions

B: Only very slight ink smudging detected on the image portions

C: Ink smudging detected on the image portions (4) Image Clarity (Glossiness)

The C value according to JIS H8686 was measured for the white areas of the obtained inkjet recording sheets with an illumination angle of 60 degrees, reflection angle of 60 degrees, optical fringe of width 2.0 mm, using an image clarity tester (trade name: ICM-1M; manufactured by Suga Test Instruments Company Ltd.). The image clarity was evaluated in line with the criteria below.

A: C value is 80% or above

B: C value is 75% up to 80%

C: C value is 70% up to 75%

D: C value is less than 7

TABLE 1A

| | | Example 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Long Roll Body | Ink Receiving Layer Thickness C (μm) | 32.0 | 32.0 | 32.0 | 32.0 | 32.0 | 32.0 | 32.0 | 32.0 | 40.0 |
| | Front Surface Thermoplastic Resin Layer Thickness A (μm) | 25.0 | 25.0 | 25.0 | 25.0 | 25.0 | 25.0 | 25.0 | 50.0 | 16.0 |
| | Paper substrate thickness (μm) | 160 | 160 | 160 | 160 | 160 | 160 | 160 | 110 | 160 |
| | Back Surface Thermoplastic Resin Layer Thickness B (μm) | 25.0 | 25.0 | 25.0 | 25.0 | 25.0 | 23.0 | 35.0 | 45.0 | 23.0 |
| | B/A | 1.000 | 1.000 | 1.000 | 1.000 | 1.000 | 0.920 | 1.400 | 0.900 | 1.438 |

TABLE 1A-continued

| | | Example 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| | B/(A + C) | 0.439 | 0.439 | 0.439 | 0.439 | 0.439 | 0.404 | 0.778 | 0.549 | 0.411 |
| | When unwinding: the side on which the recording layer is formed | Outside | Outside | Outside | Outside | Outside | Outside | Outside | Outside | Outside |
| Straightening Device | Straightening element diameter (mm) | 12 | 8 | 16 | 12 | 12 | 12 | 12 | 12 | 12 |
| | Wrap angle (degrees °) | 55 | 55 | 55 | 55 | 55 | 55 | 55 | 55 | 55 |
| | Long roll body web tension (kg/m) | 40 | 40 | 40 | 10 | 90 | 40 | 40 | 40 | 40 |
| Paper substrate composition | LBKP pulp from acacia (% by mass) | 50 | 50 | 50 | 50 | 50 | 50 | 50 | 50 | 50 |
| | LBKP pulp from aspen (% by mass) | 50 | 50 | 50 | 50 | 50 | 50 | 50 | 50 | 50 |
| Evaluation results | Ink receiving layer cracking | A | A | A | A | A | A | A | A | A |
| | Curl Tendency | A | A | A | A | A | A | A | A | A |
| | Inkjet Printer Feedability | A | A | A | A | A | A | A | A | A |
| | Image Clarity | A | A | A | A | A | A | A | A | B |

TABLE 1B

| | | Example 10 | Ex. 11 | Ex. 12 | Ex. 13 | Ex. 14 | Comparative Ex. 1 | Com. Ex. 2 | Com. Ex. 3 | Com. Ex. 4 |
|---|---|---|---|---|---|---|---|---|---|---|
| Long Roll Body | Ink Receiving Layer Thickness C (μm) | 32.0 | 32.0 | 32.0 | 32.0 | 32.0 | 32.0 | 32.0 | 32.0 | 32.0 |
| | Front Surface Thermoplastic Resin Layer Thickness A (μm) | 25.0 | 25.0 | 14.0 | 25.0 | 25.0 | 25.0 | 25.0 | 25.0 | 25.0 |
| | Paper substrate thickness (μm) | 160 | 160 | 160 | 160 | 160 | 160 | 160 | 160 | 160 |
| | Back Surface Thermoplastic Resin Layer Thickness B (μm) | 20.0 | 40.0 | 25.0 | 25.0 | 25.0 | 25.0 | 25.0 | 25.0 | 25.0 |
| | B/A | 0.800 | 1.600 | 1.786 | 1.000 | 1.000 | 1.000 | 1.000 | 1.000 | 1.000 |
| | B/(A + C) | 0.351 | 0.702 | 0.543 | 0.439 | 0.439 | 0.439 | 0.439 | 0.439 | 0.439 |
| | When unwinding: the side on which the recording layer is formed | Outside | Outside | Outside | Outside | Outside | Outside | Outside | Outside | Inside |
| Straightening Device | Straightening element diameter (mm) | 12 | 12 | 12 | 12 | 12 | 6 | 24 | 12 | 12 |
| | Wrap angle (degrees °) | 55 | 55 | 55 | 55 | 55 | 55 | 55 | 65 | 55 |
| | Long roll body web tension (kg/m) | 40 | 40 | 40 | 40 | 40 | 40 | 40 | 40 | 40 |
| Paper substrate composition | LBKP pulp from acacia (% by mass) | 50 | 50 | 50 | 28 | 50 | 50 | 50 | 50 | 50 |
| | LBKP pulp from aspen (% by mass) | 50 | 50 | 50 | 72 | 50 | 50 | 50 | 50 | 50 |
| Evaluation results | Ink receiving layer cracking | A | A | A | A | A | B | A | B | C |
| | Curl Tendency | B | A | A | A | A | A | B | C | C |
| | Inkjet Printer Feedability | A | B | B | A | A | A | C | C | A |
| | Image Clarity | A | A | B | B | A | C | A | C | C |

It is clear from the results as shown in Tables 1A and 1B above that the inkjet recording sheets manufactured according to the image recording manufacturing method of the invention have no ink receiving layer cracking nor occurrence of curl tendency, and are superior in inkjet printer feedability and image clarity.

What is claimed is:

1. An image recording medium manufacturing method comprising:

providing a web of a long roll body, which is a sheet material of a paper substrate with thermoplastic resin layers formed on both surfaces and on one of the thermoplastic resin layers is provided a recording layer with the long roll body wound such that this recording layer surface is on the outside; unwinding the web out into a cuffing device while at the same time a straightening element is pressed against the web on the side of the recording layer wherein the straightening element is a roller of a diameter of between 8 mm and 16 mm as a decurling bar; and conveying the web of the long roll body when straightening the curl such that it is contacted with the straightening element with a wrap angle of less than 60 degrees, and wherein the wrap angle is the angle formed by the crossing of the straight lines linking the center of the decurling bar to the edges of the area of contact of the long roll body web wrapping around the decurling bar.

2. The image recording medium manufacturing method according to claim 1 wherein:

the thermoplastic resin layers are formed by melt extrusion, and the ratio (B/A) of the thickness of the thermoplastic resin layer on the side without the recording layer (B) to the thickness of the thermoplastic resin layer on the side with the recording layer (A) is between 0.9 and 1.5;

and the ratio (B/(A+C) of the thickness of the thermoplastic resin layer on the side without the recording layer (B) to the sum of the thickness of the thermoplastic resin layer on the side with the recording layer (A) with the thickness of the recording layer (C) is between 0.4 and 0.8.

3. The image recording medium manufacturing method according to claim 1 wherein:

the thickness of the thermoplastic resin layer on the side of the recording layer A is between 15 μm and 60 μm.

4. The image recording medium manufacturing method according to claim 2 wherein:

the thickness of the thermoplastic resin layer on the side of the recording layer A is between 15 μm and 60 μm.

5. The image recording medium manufacturing method according to claim 2 wherein:

the paper substrate includes acacia kraft pulp of an amount which is 25% by mass or more in the pulp constituting the substrate.

6. The image recording medium manufacturing method according to claim 3 wherein:

the paper substrate includes acacia kraft pulp of an amount which is 25% by mass or more in the pulp constituting the substrate.

7. The image recording medium manufacturing method according to claim 4 wherein:

the paper substrate includes acacia kraft pulp of an amount which is 25% by mass or more in the pulp constituting the substrate.

8. The image recording medium manufacturing method according to claim 5 wherein:

the recording layer is an ink receiving layer, and the image recording medium is an inkjet recording medium.

9. The image recording medium manufacturing method according to claim 6 wherein:

the recording layer is an ink receiving layer, and the image recording medium is an inkjet recording medium.

10. The image recording medium manufacturing method according to claim 7 wherein:

the recording layer is an ink receiving layer, and the image recording medium is an inkjet recording medium.

11. The image recording medium manufacturing method according to claim 8 wherein:

the ink receiving layer comprises a water soluble resin, a cross-linking agent for cross-linking the water soluble resin, fine particles, and a mordant.

12. The image recording medium manufacturing method according to claim 9 wherein:

the ink receiving layer comprises a water soluble resin, a cross-linking agent for cross-linking the water soluble resin, fine particles, and a mordant.

13. The image recording medium manufacturing method according to claim 10 wherein:

the ink receiving layer comprises a water soluble resin, a cross-linking agent for cross-linking the water soluble resin, fine particles, and a mordant.

14. The image recording medium manufacturing method according to claim 11 wherein:

the water soluble resin comprises at least one resin selected from the group consisting of a polyvinyl alcohol resin, a cellulose resin, a resin with an ether bond, a resin with a carbamoyl group, a resin with a carboxyl group, and gelatin; and the fine particles comprise at least one type of fine particles selected from the group consisting of silica fine particles, colloidal silica, alumina fine particles, and pseudoboehmite.

15. The image recording medium manufacturing method according to claim 12 wherein:

the water soluble resin comprises at least one resin selected from the group consisting of a polyvinyl alcohol resin, a cellulose resin, a resin with an ether bond, a resin with a carbamoyl group, a resin with a carboxyl group, and gelatin; and the fine particles comprise at least one type of fine particles selected from the group consisting of silica fine particles, colloidal silica, alumina fine particles, and pseudoboehmite.

16. The image recording medium manufacturing method according to claim 13 wherein:

the water soluble resin comprises at least one resin selected from the group consisting of a polyvinyl alcohol resin, a cellulose resin, a resin with an ether bond, a resin with a carbamoyl group, a resin with a carboxyl group, and gelatin; and the fine particles comprise at least one type of fine particles selected from the group consisting of silica fine particles, colloidal silica, alumina fine particles, and pseudoboebmite.

17. The image recording medium manufacturing method according to claim 14 wherein:

the ink receiving layer comprises a layer which is formed by cross-link curing of a coated layer, formed by coating with a coating liquid containing fine particles and a water soluble resin;

the cross-link curing is carried out by the addition of a cross-linking agent to either the coating liquid or a basic liquid; and, the basic liquid with a alkalinity of pH 7.1 or above is applied either (1) at the same time as the coating liquid is coated to form the coating layer or (2) after the coating liquid is coated to form the coating layer and while the coating layer is drying in the period before the coating liquid shows a reduction in the rate of drying.

18. The image recording medium manufacturing method according to claim 15 wherein:

the ink receiving layer comprises a layer which is formed by cross-link curing of a coated layer, formed by coating with a coating liquid containing fine particles and a water soluble resin;

the cross-link curing is carried out by the addition of a cross-linking agent to either the coating liquid or a basic liquid; and, the basic liquid, with a alkalinity of pH 7.1 or above, is applied either (1) at the same time as the coating liquid is coated to form the coating layer or (2) after the coating liquid is coated to form, the coating layer and while the coating layer is drying in the period before the coating liquid shows a reduction in the rate of drying.

19. The image recording medium manufacturing method according to claim 16 wherein:

the ink receiving layer comprises a layer which is formed by cross-link curing of a coated layer, formed by coating with a coating liquid containing fine particles and a water soluble resin;

the cross-link curing is carried out by the addition of a cross-linking agent to either the coating liquid or a basic liquid; and, the basic liquid, with a alkalinity of pH 7.1 or above, is applied either (1) at the same time as the coating liquid is coated to form the coating layer or (2) after the coating liquid is coated to form the coating layer and while the coating layer is drying during a period before the coating liquid shows a reduction in the rate of drying.

20. The image recording medium manufacturing method according to claim 1 wherein:

the transfer tension applied to the web of the long roll body by the straightening element is in the range of about 5 to about 100 kg/m.

* * * * *